US012568521B2

(12) United States Patent
Cao et al.

(10) Patent No.: US 12,568,521 B2
(45) Date of Patent: Mar. 3, 2026

(54) SCHEDULING TRANSMISSION METHOD AND APPARATUS

(71) Applicant: HUAWEI TECHNOLOGIES CO., LTD., Shenzhen (CN)

(72) Inventors: Youlong Cao, Shanghai (CN); Shuri Liao, Shanghai (CN); Erkai Chen, Kista (SE); Shengyue Dou, Shanghai (CN); Shulan Feng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 322 days.

(21) Appl. No.: 18/349,934

(22) Filed: Jul. 10, 2023

(65) Prior Publication Data

US 2023/0354405 A1 Nov. 2, 2023

Related U.S. Application Data

(63) Continuation of application No. PCT/CN2021/072555, filed on Jan. 18, 2021.

(51) Int. Cl.
*H04W 72/566* (2023.01)
*H04W 72/12* (2023.01)

(52) U.S. Cl.
CPC ......... *H04W 72/566* (2023.01); *H04W 72/12* (2013.01)

(58) Field of Classification Search
CPC ............................ H04W 72/566; H04W 72/12
See application file for complete search history.

(56) References Cited

U.S. PATENT DOCUMENTS

| | | | | |
|---|---|---|---|---|
| 10,244,423 | B2 * | 3/2019 | Lee ................... | H04W 28/0263 |
| 2008/0123660 | A1 | 5/2008 | Sammour et al. | |
| 2015/0250001 | A1 | 9/2015 | Tan et al. | |
| 2017/0126758 | A1 * | 5/2017 | Sablin ..................... | H04L 47/22 |
| 2019/0230537 | A1 * | 7/2019 | Xu ........................... | H04L 69/22 |
| 2020/0099990 | A1 | 3/2020 | Boggia et al. | |
| 2020/0137428 | A1 | 4/2020 | Zhang et al. | |
| 2021/0105793 | A1 * | 4/2021 | Ko ........................ | H04W 72/52 |

(Continued)

FOREIGN PATENT DOCUMENTS

| | | |
|---|---|---|
| CN | 105681931 A | 6/2016 |
| CN | 106658223 A | 5/2017 |
| CN | 108173778 A | 6/2018 |

(Continued)

OTHER PUBLICATIONS

3GPP TR 26.928 V16.1.0 3rd Generation Partnership Project;Technical Specification Group Services and System Aspects; Extended Reality (XR) in 5G (Release 16) Dec. 2020 total 131 pages.

*Primary Examiner* — Umar Cheema

(57) ABSTRACT

The disclosure provides a scheduling transmission method and an apparatus. The method includes: obtaining a scheduling priority of a terminal, and transmitting a data packet of the terminal based on the scheduling priority of the terminal, where the scheduling priority of the terminal is determined based on importance of a data unit to which the data packet of the terminal belongs and a size level of the data unit to which the data packet of the terminal belongs. Solutions of this disclosure may be widely used in the fields of communication technologies, artificial intelligence, internet of vehicles, internet of smart home, and the like.

14 Claims, 8 Drawing Sheets

(56) References Cited

U.S. PATENT DOCUMENTS

2023/0353806 A1* 11/2023 Cao ..................... H04W 72/566
2025/0240803 A1* 7/2025 Abdelghaffar ........ H04W 72/12

FOREIGN PATENT DOCUMENTS

| | | | | |
|---|---|---|---|---|
| CN | 109639591 A | | 4/2019 | |
| CN | 111263192 A | | 6/2020 | |
| EP | 1619839 A1 | * | 1/2006 | ............. H04L 12/56 |
| WO | WO-2009002325 A1 | * | 12/2008 | ......... H04L 47/6215 |
| WO | 2014046610 A1 | | 3/2014 | |
| WO | 2017161999 A1 | | 9/2017 | |

* cited by examiner

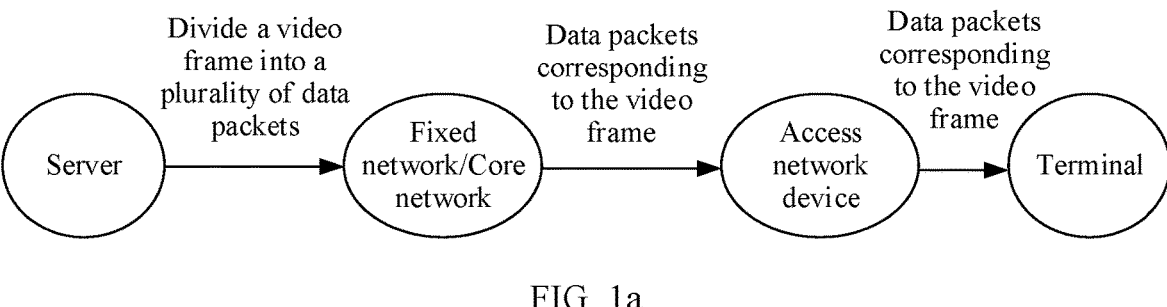
FIG. 1a
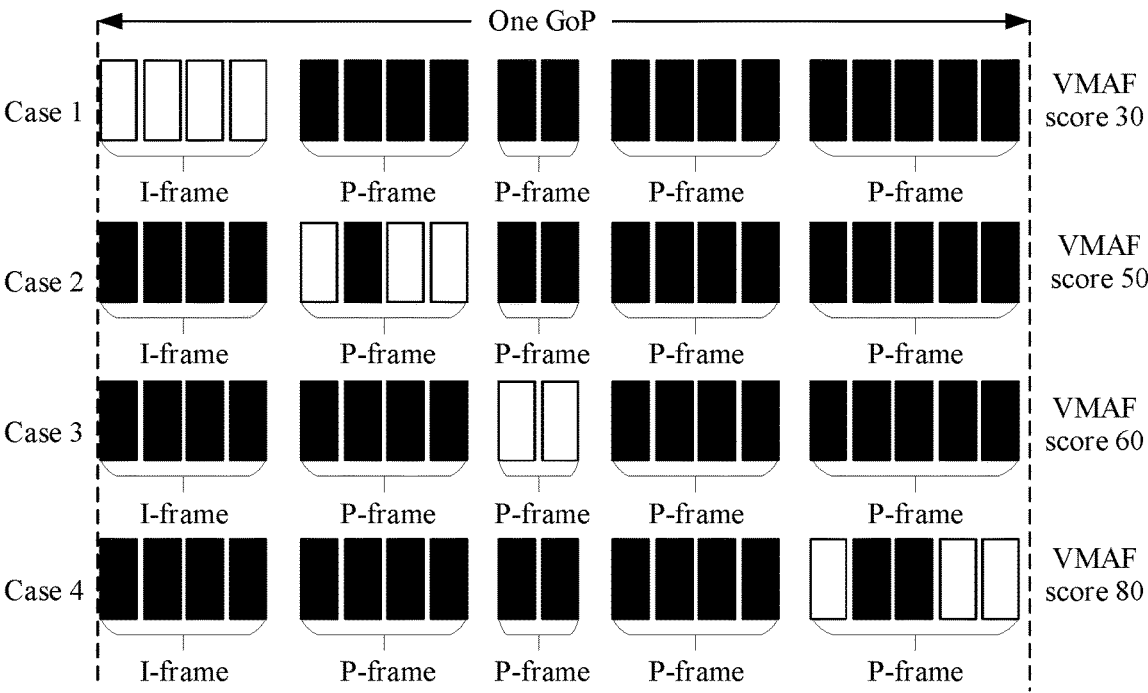
FIG. 1b
FIG. 1c

Terminal

Access network device

Step 501: Determine a scheduling priority of the terminal based on importance of a data unit to which a data packet of the terminal belongs and a size level of the data unit to which the data packet of the terminal belongs Step 502: Transmit the data packet with the terminal based on the scheduling priority of the terminal

SCHEDULING TRANSMISSION METHOD AND APPARATUS

CROSS-REFERENCE TO RELATED APPLICATIONS

This application is a continuation of International Application No. PCT/CN2021/072555, filed on Jan. 18, 2021, the disclosure of which is hereby incorporated by reference in its entirety.

TECHNICAL FIELD

This disclosure relates to the field of communication technologies, and in particular, to a scheduling transmission method and an apparatus.

BACKGROUND

In recent years, with continuous progress and improvement of an extended reality (extended reality, XR) technology, a related industry has been developed vigorously. Nowadays, the XR technology has entered various fields, for example, education, entertainment, military affairs, medical care, environmental protection, transportation, and public health, closely related to production and life of people. How to ensure efficient transmission of an XR service and improve transmission performance of the XR service becomes a problem to be resolved urgently.

SUMMARY

Embodiments of this application provide a scheduling transmission method and an apparatus, to improve transmission efficiency and transmission performance of an XR service.

To achieve the foregoing objective, the following technical solutions are used in embodiments of this application.

According to a first aspect, a scheduling transmission method is provided. The method may be performed by an access network device, or may be performed by a chip or a functional module in the access network device. The method includes: obtaining a scheduling priority of a terminal, and transmitting a data packet with the terminal based on the scheduling priority of the terminal, where the scheduling priority of the terminal is determined based on importance of a data unit to which the data packet of the terminal belongs and a size level of the data unit to which the data packet of the terminal belongs.

Alternatively, in embodiments of this application, it is not limited whether the scheduling priority of the terminal is determined based on the importance of the data unit to which the data packet of the terminal belongs and the size level of the data unit to which the data packet of the terminal belongs, the importance of the data unit to which the data packet of the terminal belongs, or the size level of the data unit to which the data packet of the terminal belongs.

Based on the method according to the first aspect, the scheduling priority of the terminal is determined based on the importance of the data unit to which the data packet of the terminal belongs and/or the size level of the data unit to which the data packet of the terminal belongs, and a terminal whose data unit is important and whose data amount is small is preferentially scheduled to transmit data packets, so as to maximize a quantity of correctly transmitted video frames corresponding to the data packets of the terminal whose data unit is important and whose data amount is small, thereby meeting a video frame correctness rate requirement, and improving user experience and system performance.

In a possible design, the importance of the data unit to which the data packet of the terminal belongs is determined based on one or more of a position, in a group of pictures (group of pictures, GoP), of a video frame to which the data packet of the terminal belongs, a position of the data unit in the video frame to which the data unit belongs, and a user level corresponding to the terminal.

Based on the possible design, in positions of video frames in the GoP and/or positions, in the video frame, of units included in the video frame, importance of a video frame located in the front (or whose transmission time is relatively early) in the GoP and/or a data unit in a field of view (field of view, FOV) of the video frame may be set to a higher value, so as to preferentially schedule the video frame located in the front and/or the data unit located in the field of view. In this way, it is ensured that such video frame and/or data unit can be correctly transmitted, so that other video frame and/or data unit that rely on such the video frame and/or data unit can be completely recovered. In addition, the user level corresponding to the terminal may also be considered, and importance of a video frame of a terminal with a higher user level is set to a higher value, so that the terminal with a higher user level is preferentially scheduled, thereby improving user experience.

In a possible design, importance of video frames in a first position and a second position in the GoP is the same. The first position and the second position may be adjacent positions in the GoP. Picture content of the video frame in the first position is strongly associated with picture content of the video frame in the second position, and a complete video frame may be recovered through mutual reference/reliance between the picture content of the video frames in the first position and the second position. For example, the first position may be the $1^{st}$ position in the GoP, and the second position may be the $2^{nd}$ position in the GoP. Alternatively, the first position is the $3^{rd}$ position in the GoP, and the second position is the $4^{th}$ position in the GoP.

Based on the possible design, importance of two or more video frames at consecutive positions may be set to be the same, thereby reducing signaling overheads.

In a possible design, the data packet of the terminal carries first information, where the first information indicates importance of the data unit to which the data packet of the terminal belongs and the size level of the data unit to which the data packet of the terminal belongs; or the data packet of the terminal carries second information, where the second information indicates the data unit to which the data packet belongs, or indicates the data unit to which the data packet belongs and a total quantity of data packets included in the data unit, so that a core network device or an access network device obtains, based on the second information, data packets included in the video frame to which the data packet of the terminal belongs, the total quantity of data packets included in the data unit to which the data packet belongs, and a data amount of the data unit to which the data packet belongs.

Based on the possible design, the importance of the data unit to which the data packet of the terminal belongs and the size level of the data unit to which the data packet of the terminal belongs are effectively and flexibly determined based on the information carried in the data packet, thereby reducing signaling overheads and simplifying a system design.

In a possible design, there is a correspondence between the size level of the data unit to which the data packet of the terminal belongs and a first ratio, and the first ratio=A/B, where A is a size of the data unit to which the data packet of the terminal belongs, and B is an average value of sizes of data units successfully transmitted by the terminal, or B is an average value of sizes of data units of a video source corresponding to the data packet of the terminal.

Based on the possible design, the size level of the data unit is effectively and flexibly determined in either of two calculation manners based on the ratio of the size of the data unit to the average value of sizes of data units.

In a possible design, that the scheduling priority of the terminal is determined based on importance of a data unit to which a data packet of the terminal belongs and a size level of the data unit to which the data packet of the terminal belongs includes: The scheduling priority of the terminal is determined based on the importance of the data unit to which the data packet of the terminal belongs, the size level of the data unit to which the data packet of the terminal belongs, and a first parameter, where the first parameter includes one or more of a ratio of transmitted data packets of the data unit to which the data packet of the terminal belongs, an estimated transmission delay of a remaining data packet of the data unit to which the data packet of the terminal belongs, an instantaneous rate of the terminal, or a historical transmission rate of the terminal.

Based on the possible design, in addition to the importance of the data unit to which the data packet of the terminal belongs and the size level of the data unit, the scheduling priority of the terminal may be further determined based on one or more other parameters, so that the scheduling priority of the terminal is determined based on a plurality of factors, thereby meeting a plurality of requirements of the terminal and improving user experience.

In a possible design, that the scheduling priority of the terminal is determined based on importance of a data unit to which a data packet of the terminal belongs and a size level of the data unit to which the data packet of the terminal belongs includes: when the data packet of the terminal is a data packet of a first service, determining the scheduling priority of the terminal based on the importance of the data unit to which the data packet of the terminal belongs and the size level of the data unit to which the data packet of the terminal belongs, where a target video frame correctness rate of the first service is greater than a threshold.

Based on the possible design, when the data packet of the first service of the terminal is scheduled, the scheduling priority of the terminal may be determined based on importance of a data unit to which the data packet of the first service of the terminal belongs and a size level of the data unit to which the data packet of the first service of the terminal belongs, thereby improving transmission efficiency of the first service and system performance.

In a possible design, the first service is an XR service. Based on the possible design, the method in embodiments of this application is applicable to scheduling transmission of the XR service.

In a possible design, the method further includes: determining, based on a transmission characteristic of the data packet of the terminal, that the data packet of the terminal is the data packet of the first service, where the transmission characteristic includes a transmission periodicity and/or an amount of transmitted data; determining, based on a radio bearer for transmitting the data packet of the terminal and a correspondence between a radio bearer and a service, that the data packet of the terminal is the data packet of the first service; or determining, based on a quality of service identifier carried in the data packet of the terminal and a correspondence between a quality of service identifier and a service, that the data packet of the terminal is the data packet of the first service.

Based on the possible design, the data packet of the terminal may be flexibly and effectively identified as the data packet of the first service based on the inherent transmission characteristic of the data packet and/or a transmission resource that matches a transmission requirement of a service to which the data packet belongs. That is, the service to which the data packet of the terminal belongs is the first service.

In a possible design, the scheduling priority of the terminal is determined by a first network element based on the importance of the data unit to which the data packet of the terminal belongs and the size level of the data unit to which the data packet of the terminal belongs, where the first network element is an access network device or a chip or a functional module in the access network device, or the first network element is a core network device or a chip or a functional module in the core network device. Based on the possible design, a scenario to which embodiments of this application are applicable is effectively and flexibly deployed.

According to a second aspect, this application provides a communication apparatus. The communication apparatus may be an access network device or a chip or a system-on-a-chip in the access network device, or may be a functional module that is in the communication apparatus and that is configured to implement the method according to any one of the first aspect or the possible designs of the first aspect. The communication apparatus may implement functions performed by the communication apparatus in the foregoing aspect or the possible designs, and the functions may be implemented by hardware executing corresponding software. The hardware or the software includes one or more modules corresponding to the functions. For example, the communication apparatus may include a processing unit and a transceiver unit.

The processing unit is configured to determine a scheduling priority of a terminal, where the scheduling priority of the terminal is determined based on importance of a data unit to which a data packet of the terminal belongs and a size level of the data unit to which the data packet of the terminal belongs.

The processing unit is further configured to control the transceiver unit to transmit the data packet with the terminal based on the scheduling priority of the terminal.

For related descriptions of the importance of the data unit to which the data packet of the terminal belongs, the size level of the data unit to which the data packet of the terminal belongs, and a determining manner, refer to the descriptions in any one of the first aspect or the possible designs of the first aspect. Details are not described again.

For a specific implementation of the communication apparatus, refer to behavior functions of the access network device in the scheduling transmission method provided in any one of the first aspect or the possible designs of the first aspect. Details are not described herein again. Therefore, the access network device provided in the second aspect achieves a same beneficial effect as any one of the first aspect or the possible designs of the first aspect.

According to a third aspect, a communication apparatus is provided. The communication apparatus may be an access network device, or a chip or a system-on-a-chip in the access network device. The communication apparatus may implement functions performed by the access network device in the foregoing aspects or the possible designs, and the functions may be implemented by hardware. In a possible design, the communication apparatus may include a processor and a communication interface. The processor may be configured to support the communication apparatus in implementing the functions in any one of the first aspect or the possible designs of the first aspect. For example, the processor is configured to: determine a scheduling priority of a terminal, and control a communication interface to transmit a data packet with the terminal based on the scheduling priority of the terminal, where the scheduling priority of the terminal is determined based on importance of a data unit to which the data packet of the terminal belongs and a size level of the data unit to which the data packet of the terminal belongs. In another possible design, the communication apparatus may further include a memory, configured to store computer-executable instructions and data that are necessary for the communication apparatus. When the communication apparatus runs, the processor executes the computer-executable instructions stored in the memory, to enable the communication apparatus to perform the scheduling transmission method according to any one of the first aspect or the possible designs of the first aspect.

According to a fourth aspect, a computer-readable storage medium is provided. The computer-readable storage medium may be a readable non-volatile storage medium. The computer-readable storage medium stores instructions. When the instructions are run on a computer, the computer is enabled to perform the scheduling transmission method according to any one of the first aspect or the possible designs of the foregoing aspects.

According to a fifth aspect, a computer program product including instructions is provided. When the computer program product runs on a computer, the computer is enabled to perform the scheduling transmission method according to any one of the first aspect or the possible designs of the foregoing aspect.

According to a sixth aspect, a communication apparatus is provided. The communication apparatus may be an access network device, or a chip or a system-on-a-chip in the access network device. The communication apparatus includes one or more processors and one or more memories. The one or more memories are coupled to the one or more processors, and the one or more memories are configured to store computer program code. The computer program code includes computer instructions. When the one or more processors execute the computer instructions, the communication apparatus is enabled to perform the scheduling transmission method according to any one of the first aspect or the possible designs of the first aspect.

For technical effects achieved by any one of the design manners of the third aspect to the sixth aspect, refer to the technical effects achieved by any one of the first aspect or the possible designs of the first aspect. Details are not described again.

According to a seventh aspect, an embodiment of this application provides a communication system. The communication system may include a terminal and the communication apparatus according to any one of the second aspect or the sixth aspect.

BRIEF DESCRIPTION OF DRAWINGS

FIG. 1*a* is a schematic diagram of a single-stream transmission mode;

FIG. 1*b* is a schematic diagram of a multi-stream transmission mode;

FIG. 1*c* is a schematic diagram of transmission cases of a video frame in a GoP;

DESCRIPTION OF EMBODIMENTS

Figures 2, 3A, 3B:
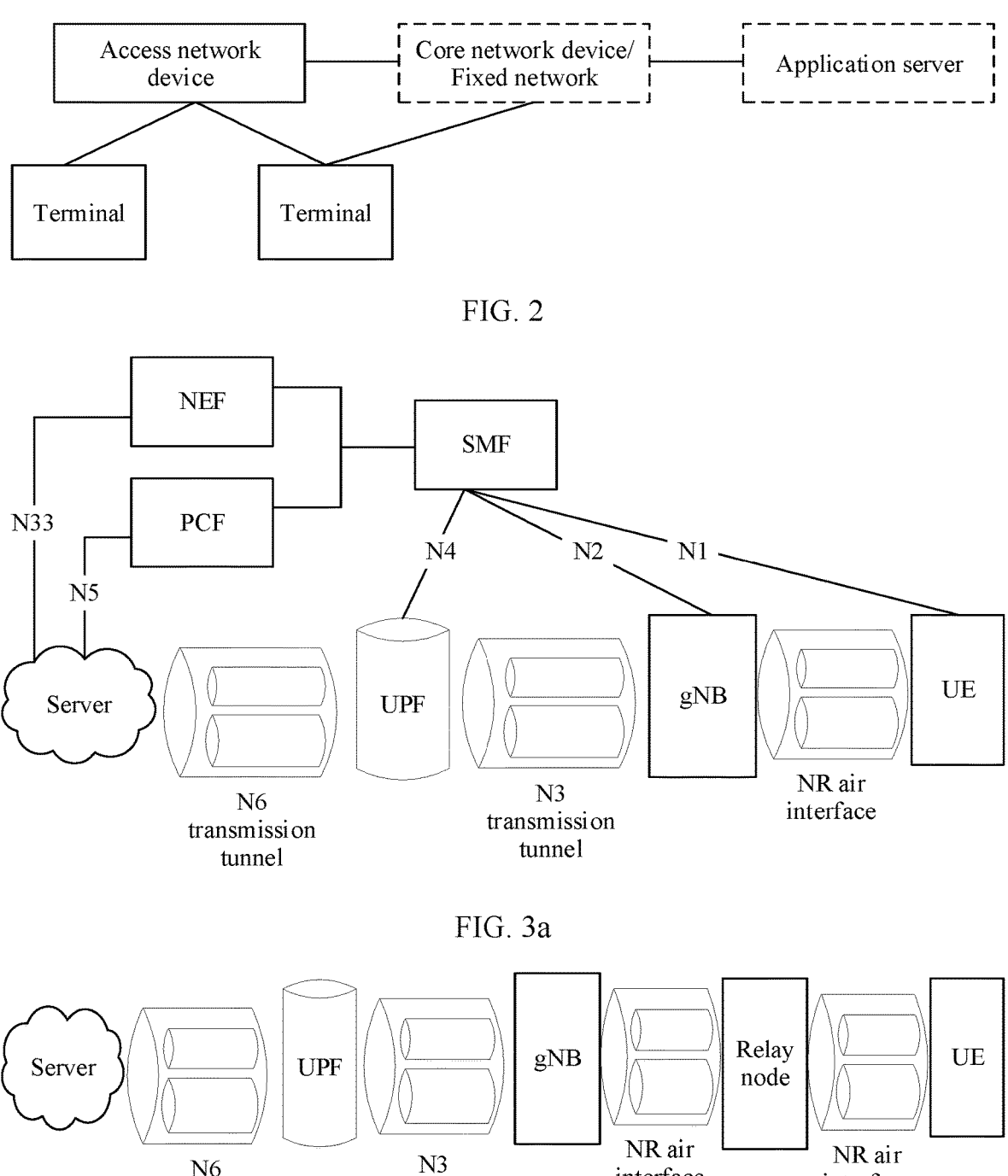
FIG. 2 is a simplified schematic diagram of a communication system according to an embodiment of this application.
FIG. 3*a* to FIG. 3*d* are simplified schematic diagrams of a communication system according to an embodiment of this application.

Before embodiments of this application are described, some terms in embodiments of this application are explained.

An XR (extended reality, XR) service is a general term for services related to extended reality, and the XR service includes a virtual reality (virtual reality, VR) service, an augmented reality (augmented reality, AR) service, and a mixed reality (mixed reality, MR) service. The VR service mainly means rendering of visual and audio scenarios to simulate sensory stimulation of vision and audio in a real world to a user as much as possible. The AR service mainly means providing additional visual or auditory information or manually generating content in a real environment perceived by a user. The MR service is an advanced form of the AR service. One of implementations of the MR service is inserting some virtual elements into a physical scenario, to provide a user with immersive experience in which the elements are a part of the real scenario.

A transmission mode of the XR service may include a single-stream transmission mode and a multi-stream transmission mode. The following describes the two transmission modes and a scheduling algorithm in each transmission mode.

1. Single-Stream Transmission Mode

The single-stream transmission mode may mean that a data packet corresponding to a video frame of an XR service is transmitted through a layer of code stream. For example, FIG. 1*a* shows a process of sending a video frame of an XR service to a terminal in a single-stream transmission mode. As shown in FIG. 1*a*, an application server may divide one video frame of the XR service into dozens of data packets (for example, internet protocol (internet protocol, IP) packets), and send the dozens of data packets to a fixed network/core network. The fixed network/core network sends the dozens of data packets to an access network device, and the access network device sequentially sends the dozens of data packets to the terminal through the layer of code stream.

A scheduling algorithm in the single-stream transmission mode may include an RR algorithm, a PF algorithm, and the like. In the RR algorithm, during air interface resource allocation, a plurality of terminals to be scheduled are arranged into a queue, scheduling in a polling mode starts from an initial terminal in the queue, and a scheduled terminal is moved to the end of the queue. The RR algorithm can ensure that the plurality of terminals have a same scheduling opportunity. The RR algorithm can be regarded as fair scheduling.

In the PF algorithm, a scheduling priority of a terminal is determined based on an instantaneous rate of the terminal and a weighted average throughput of the terminal, and a terminal to be scheduled is selected based on the determined scheduling priority. In addition, a maximum throughput of a system and fairness of terminals are considered. In this application, a scheduling priority obtained through calculation by using the PF algorithm is referred to as a PF. The scheduling priority PF of the terminal satisfies the following formula (1):

$$PF = \frac{R_{instant}}{R_{history}} \qquad \text{formula (1)}$$

$R_{instant}$ in the formula (1) is the instantaneous rate of the terminal, and $R_{instant}$ may be obtained through calculation based on a current channel state parameter (for example, channel state information (channel state information, CSI) or a rank indication (rank indication, RI)) of the terminal. $R_{history}$ is a historical transmission rate of the terminal, and $R_{history}$ is an average rate at which the terminal receives a data packet in a period of time before a current moment.

It can be learned from the formula (1) that, if there are a plurality of to-be-scheduled terminals in a same cell, when an access network device continuously schedules a terminal with relatively good channel quality, and a historical transmission rate of the terminal gradually increases, a scheduling priority of the terminal gradually decreases, and the access network device schedules another terminal with a relatively high priority. If channel quality of a terminal is relatively poor and the terminal cannot be scheduled by the access network device for long time, a historical transmission rate of the terminal decreases, and a scheduling priority of the terminal obtained through calculation by using the formula (1) increases, so that the terminal obtains a scheduling opportunity.

2. Multi-Stream Transmission Mode

The multi-stream transmission mode may mean that transmission resources are divided in time, space, and frequency domain to obtain a base layer (base layer, BL) and an enhancement layer (enhancement layer, EL). The BL is for transmitting a data packet corresponding to a video frame of an XR service. The data packet transmitted on the BL (which may be referred to as a BL data packet for short) may enable a decoder to completely and normally decode basic video content, thereby ensuring basic user experience, and a data amount of the data packet transmitted on the BL is relatively small. The EL is for transmitting detail information corresponding to the data packet. The detail information may be for enhancing picture quality corresponding to the data packet, and a data amount of the detail information corresponding to the data packet transmitted on the EL (which may be referred to as an EL data packet for short) is relatively large.

For example, FIG. 1b shows a process of sending a video frame of an XR service to a terminal in a multi-stream transmission mode. As shown in FIG. 1b, an application server may perform encoding processing on a data packet corresponding to the video frame of the XR service to obtain the BL data packet and the EL data packet, and send the BL data packet and the EL data packet to a UPF. The UPF forwards the BL data packet and the EL data packet to an access network device, and the access network device sends the BL data packet and the EL data packet to the terminal.

In the multi-stream transmission mode, for both the BL data packet and the EL data packet, the scheduling priority of the terminal may be obtained through calculation by using the PF algorithm shown in the foregoing formula (1). Because the BL data packet carries the basic video content, and the EL data packet carries a detail part corresponding to the basic video content, quality of service (quality of service, QoS) requirements of the BL data packet and the EL data packet are different. For example, the QoS requirement of the BL data packet is greater than the QoS requirement of the EL data packet. For a same terminal, to ensure the QoS requirements of the data packets, a scheduling priority of the BL data packet may be configured to be higher than a scheduling priority of the EL data packet. For example, the scheduling priority BL_PF of the BL data packet and the scheduling priority EL_PF of the EL data packet separately satisfy the following formulas:

$$BL\_PF = \frac{R_{instant}}{R_{history}} + \Delta$$

$$EL\_PF = \frac{R_{instant}}{R_{history}}$$

Related descriptions of $R_{instant}$ and $R_{history}$ are shown above, and details are not described again. $\Delta$ is a preset offset value greater than 0, and $\Delta$ can ensure that the scheduling priority of the BL data packet is higher than the scheduling priority of the EL data packet.

It can be known from the above that the scheduling algorithms in the single-stream transmission mode and the multi-stream transmission mode can ensure scheduling fairness among a plurality of to-be-scheduled terminals that are in one cell.

However, due to an impact of a code control manner and a resolution of video encoding, sizes of video frames of XR services of different terminals fluctuate. This fluctuation causes deterioration of network air interface transmission performance. For example, an XR video is played at a fixed frame rate, for example, is transmitted at a fixed frame rate of 30 frames per second (frame per second, FPS), 60 FPS, or 120 FPS. When an air interface transmission resource is fixed, if a data amount of a video frame of a terminal is large, transmission efficiency of the video frame is low, and a transmission delay is increased. Consequently, transmission of a video frame that is of another terminal and that is with a small data amount is affected, and even cannot be performed. In this way, transmission performance of the network air interface is reduced.

In addition, there is a reference relationship between video frames in a GoP during encoding and decoding. If a video frame in a position in the GoP is faulty, other video frames that refer to the video frame for image recovery are also faulty, and video quality of the GoP is reduced. For example, a video multi-method assessment fusion (video multi-method assessment fusion, VMAM) score corresponding to the GoP is reduced. For example, FIG. 1c is a schematic diagram of transmission cases of a video frame in a GoP. As shown in FIG. 1c, one GoP includes one I-frame and four P-frames. Recovery of the P-frame relies on the I-frame at an initial position, and the P-frame and the I-frame have a strong association relationship. In the four P-frames, a subsequent P-frame relies on a front P-frame. As shown in Case 1 in FIG. 1c, if the I-frame fails to be transmitted, all video frames in the GoP cannot be recovered, and a VMAM score is relatively low and is 30. In Case 2, the I-frame is correctly transmitted, but the $1^{st}$ P-frame fails to be transmitted. Because the subsequent three P-frames all need to refer to the P-frame during decoding, the four P-frames in the GoP cannot be correctly decoded, and the VMAF score is 50. In Case 3, the I-frame and the $1^{st}$ P-frame are correctly transmitted, but the $2^{nd}$ P-frame fails to be transmitted. Because the subsequent two P-frames both need to refer to the P-frame during decoding, the three P-frames in the GoP cannot be correctly decoded, and the VMAF score is 60. In Case 4, the I-frame is correctly transmitted, and the $1^{st}$, $2^{nd}$, and $3^{rd}$ P-frames are correctly transmitted. Because a subsequent P-frame needs to refer to a front video frame during decoding, one P-frame in the GoP cannot be correctly decoded, and a VMAF score is 80.

It can be learned from the above that, size fluctuation of the video frames of the XR service and different importance of the video frames have a great impact on system performance. However, in the scheduling algorithms in the single-stream transmission mode and the multi-stream transmission mode, only scheduling fairness among the plurality of to-be-scheduled terminals that are in one cell is considered, and size fluctuation of the video frames and the different importance of the video frames are not considered.

To resolve the foregoing technical problem, an embodiment of this application provides a scheduling transmission method. The method may include: obtaining a scheduling priority of a terminal, and transmitting a data packet with the terminal based on the scheduling priority of the terminal, where the scheduling priority of the terminal is determined based on importance of a data unit to which the data packet of the terminal belongs and a size level of the data unit to which the data packet of the terminal belongs. For example, a terminal whose data unit is important and whose data unit is relatively small corresponds to a high scheduling priority, so that the terminal whose data unit is important and whose data unit is relatively small is preferentially scheduled to transmit a data packet, so as to maximize a quantity of correctly transmitted video frames of the terminal, and improve transmission efficiency of the data packet of the terminal. In this way, a video frame of relatively high importance is correctly transmitted, and other video frames associated with the video frame are further recovered, thereby improving user experience and system performance.

The following describes the data unit to which the data packet of the terminal belongs, the importance of the data unit to which the data packet of the terminal belongs, the size level of the data unit to which the data packet belongs, and the scheduling priority of the terminal.

In embodiments of this application, the data packet of the terminal may carry some or all picture content corresponding to the data unit. The data unit to which the data packet of the terminal belongs may be a video frame, or may be a part of the video frame, for example, may be a slice (slice) of the video frame, or a tile (tile) of the video frame, or may be a data unit of another granularity. This is not limited. The slice may be a slice formed by cutting a picture image corresponding to the video frame in a horizontal/vertical direction. The tile may be a (rectangular) area formed by dividing a picture image corresponding to the video frame in two directions: horizontal and vertical.

In embodiments of this application, the importance of the data unit to which the data packet of the terminal belongs may be used to represent an impact of the data unit on image quality during image recovery. In this application, a name of the importance of the data unit to which the data packet of the terminal belongs is not limited. The importance of the data unit to which the data packet of the terminal belongs may also be named as an importance coefficient of the data unit to which the data packet of the terminal belongs or may have another name, and this is not limited.

When the data unit is a video frame, the importance of the data unit may be determined based on a position of the data unit in a GoP. There is a reference relationship between video frames in the GoP during encoding and decoding. For example, a video frame is encoded and decoded by referring to another video frame in a front position in the same GoP. If an error occurs in a video frame in the front position, an error may also occur in other video frames that refer to the video frame for image recovery. Therefore, when a video frame is encoded and decoded by referring to another video frame in a front position in a same GoP, importance of a video frame in a front position is higher, and importance of a video frame in a rear position is lower.

In a possible design, importance is set for a video frame in a position in a same GoP, and importance of video frames in different positions is different, that is, importance of a video frame is in one-to-one correspondence with a position of the video frame in the GoP. In another possible design, to reduce data overheads, importance corresponding to two or more consecutive (or adjacent) positions in a same GoP may be set as the same. For example, importance of video frames in a first position and a second position in the same GoP is the same, and the first position and the second position are adjacent.

For example, importance of video frames in two positions is the same. Table 1 shows a correspondence between video frames in different positions and importance of the video frames. As shown in Table 1, a GoP includes eight video frames: a video frame in position 0 to a video frame in position 7. Importance of the video frames in position 0 and position 1 is the same, and is set to 00; importance of the video frames in position 2 and position 3 is the same, and is set to 01; importance of the frames in position 4 and position 5 is the same, and is set to 10; and importance of the video frames in position 6 and position 7 is the same, and is set to 11.

TABLE 1

| Positions of video frames in the GoP | Importance of the video frames |
| --- | --- |
| 0 and 1 | 00 |
| 2 and 3 | 01 |
| 4 and 5 | 10 |
| 6 and 7 | 11 |

It should be noted that Table 1 is an example table. Table 1 is intended to describe the correspondence between positions of video frames in a GoP and importance of the video frames more clearly, and does not constitute a limitation on a value of the importance of the video frames. For example, a quantity of bits corresponding to the importance of the video frames is not limited, and two bits "00" may be used to represent importance of the $0^{th}$ and $1^{st}$ frames, or three bits "000" may be used to represent importance of the $0^{th}$ and $1^{st}$ frames. In addition, in Table 1, the value of the importance of the video frames is in a negative correlation with the importance of the video frames. A smaller value of importance indicates higher importance, and a larger value of importance indicates lower importance. It should be understood that a relationship between the value of the importance of the video frames and the importance of the video frames in Table 1 is merely an example, where the value of the importance of the video frames may alternatively be set to be in a positive correlation with the importance of the video frames, and this is not limited.

Picture content in an FOV of a video frame is relatively important, and has relatively great impact on picture quality of the video frame. Picture content outside the FOV (for example, at an edge of a picture image corresponding to the video frame) has a relatively small impact on the picture quality of the video frame. Therefore, when the data unit is a slice of the video frame or a tile of the video frame, the importance of the data unit may be determined based on one or more of a position, in a GoP, of a data unit to which the data unit belongs and a position of the data unit in the video frame.

For example, in a possible design, the importance of the data unit is determined based on the position, in the GoP, of the data unit to which the data unit belongs. For example, the importance of the video frame to which the data unit belongs is used as the importance of the data unit, and the importance of the video frame is determined based on the position of the video frame in the GoP. Alternatively, in another possible design, the importance of the data unit is determined based on the position, in the GoP, of the data unit to which the data unit belongs. For example, importance of a data unit in an FOV of the video frame is higher, and importance of a data unit outside the FOV of the video frame is lower. Alternatively, in still another possible design, the importance of the data unit may be determined based on the position, in the GoP, of the data unit to which the data unit belongs and the position of the data unit in the video frame (for example, whether the data unit is in an FOV). For example, importance of a data unit that is located in the FOV of the video frame and that belongs to the video frame that is in a front position in the GoP is higher, and importance of a data unit that is located outside the FOV of the video frame and that belongs to the video frame that is in a rear position in the GoP is lower.

For example, importance of a slice is determined based on a position of the slice in a video frame. Table 2 shows a correspondence between a position of a slice in a video frame and importance of the slice. As shown in Table 2, importance of a slice in the FOV is set to "00", and importance of a slice outside the FOV is set to "01".

TABLE 2

| Position of the slice in the video frame | Importance of the slice |
| --- | --- |
| In the FOV | 00 |
| Outside the FOV | 01 |

It should be noted that Table 2 is an example table. Table 2 is intended to describe the correspondence between a position of a slice in a video frame and importance of the slice more clearly, and does not constitute a limitation on a value of the importance of the slice. For example, a quantity of bits corresponding to the importance of the slice is not limited, and two bits "00" may be used to represent the importance of the slice in the FOV, or three bits "000" may be used to represent the importance of the slice in the FOV. In addition, in Table 2, the value of the importance of the slice is in a negative correlation with the importance of the slice. A smaller value of importance indicates higher importance, and a larger value of importance indicates lower importance. It should be understood that a relationship between the value of the importance of the slice and the importance of the slice in Table 2 is merely an example, where the value of the importance of the slice may alternatively be set to be in a positive correlation with the importance of the slice, and this is not limited.

For another example, the data unit is a slice, and importance of the slice may be determined based on a position, in a GoP, of a slice to which the slice belongs and a position of the slice in a video frame (for example, whether the slice is in an FOV). For the importance of the data unit, not only the position of the data unit in the video frame needs to be considered, but also a position of the video frame in the GoP may be considered. Table 3 shows a correspondence between a position of a slice in a video frame, a position of the video frame in a GoP, and importance of the slice. As shown in Table 3, for same video frame 1, slice 1 in video frame 1 is in an FOV of video frame 1, and a slice 2 in video frame 1 is outside the FOV of video frame 1. The two slices have different importance. The importance of slice 1 in video frame 1 is set to "00", and the importance of slice 2 in video frame 1 is set to "01". For slice 1 in video frame 1 and slice 1 in video frame 2, although the two slices are both located in an FOV, locations of the video frames to which the two slices belong are different in the GoP, video frame 1 is located in position 1 in the GoP, and video frame 2 is located in position 4 in the GoP. Position 1 is in the front of position 4, so that importance of the two slices is different. For example, the importance of slice 1 in the FOV in video frame 1 is set to "00", and the importance of slice 1 in the FOV in video frame 2 is set to "10".

TABLE 3

| slice | Position of the slice in the video frame | Position of the video frame in the GoP | Importance of the slice |
| --- | --- | --- | --- |
| slice 1 in video frame 1 | In the FOV | 1 | 00 |
| slice 2 in video frame 1 | Outside the FOV | 1 | 01 |
| slice 1 in video frame 2 | In the FOV | 4 | 10 |
| slice 2 in video frame 2 | Outside the FOV | 4 | 11 |

It should be noted that Table 3 is an example table. Table 3 is intended to describe the correspondence between a position of a slice in a video frame, whether the slice is in an FOV, and importance of the slice more clearly, and does not constitute a limitation on a value of the importance of the slice. For example, a quantity of bits corresponding to the importance of the slice is not limited, and two bits "00" may be used to represent the importance of the slice in the FOV and in position 1, or three bits "000" may be used to represent the importance of the slice in the FOV and in position 1. In addition, in Table 3, the value of the importance of the slice is in a negative correlation with the importance of the slice. A smaller value of importance indicates higher importance, and a larger value of importance indicates lower importance. It should be understood that a relationship between the value of the importance of the slice and the importance of the slice in Table 3 is merely an example, where the value of the importance of the slice may alternatively be set to be in a positive correlation with the importance of the slice, and this is not limited.

Further, optionally, in embodiments of this application, an impact of a user level of the terminal on the importance of the data unit is further considered. For example, the importance of the data unit to which the data packet of the terminal belongs is determined based on one or more of a position, in a GoP, of a video frame corresponding to the data unit to which the data packet of the terminal belongs, a position, in the video frame, of the data unit to which the data packet of the terminal belongs, and the user level of the terminal. For example, the importance of the data unit to which the data packet of the terminal belongs is determined based on the position, in the GoP, of the video frame corresponding to the data unit to which the data packet of the terminal belongs and the user level. For video frames in a same position, a user is a very important person (very important person, VIP) user, and importance of a video frame requested by the user is set to be higher, so as to preferentially schedule a data packet of the user, and importance of a video frame requested by a common user is set to be lower, so as to schedule a data packet of the user later.

For example, as shown in Table 4, the GoP includes eight video frames: a video frame in position 0 to a video frame in position 7. Importance of video frames in position 0 and position 1 of the common user is set to 000, and importance of video frames in position 0 and position 1 of the VIP user is set to 001. Importance of video frames in positions 2 and 3 of the common user is set to 001, and importance of video frames in positions 2 and 3 of the VIP user is set to 010. Importance of video frames in positions 4 and 5 of the common user is set to 010, and importance of video frames in positions 4 and 5 of the VIP user is set to 011. Importance of video frames in positions 6 and 7 of the common user is set to 011, and importance of video frames in positions 6 and 7 of the VIP user is set to 100.

TABLE 4

| Positions of video frames in the GoP | Importance of video frames of the common user | Importance of video frames of the VIP user |
| --- | --- | --- |
| 0 and 1 | 000 | 001 |
| 2 and 3 | 001 | 010 |
| 4 and 5 | 010 | 011 |
| 6 and 7 | 011 | 100 |

It should be noted that Table 4 is an example table. Table 4 is intended to describe the correspondence between a user level of a terminal, positions of video frames in a GoP, and importance of the video frames more clearly, and does not constitute a limitation on a value of the importance of the video frames. For example, a quantity of bits corresponding to the importance of the video frames is not limited, and three bits "001" may be used to represent importance of the $0^{th}$ and $1^{st}$ frames of the VIP user, or four bits "0001" may be used to represent importance of the $0^{th}$ and $1^{st}$ frames of the VIP user. In addition, in Table 4, the value of the importance of the video frames is in a negative correlation with the importance of the video frames. A smaller value of importance indicates higher importance, and a larger value of importance indicates lower importance. It should be understood that a relationship between the value of the importance of the video frames and the importance of the video frames in Table 4 is merely an example, where the value of the importance of the video frames may alternatively be set to be in a positive correlation with the importance of the video frames, and this is not limited.

Table 4 is described by using the correspondence between a user level of a terminal, positions of video frames in a GoP, and importance of the video frames as an example. It should be understood that, referring to Table 4, if the importance of the data unit is determined based on the position, in the GoP, of the video frame corresponding to the data unit to which the data packet of the terminal belongs, the position, in the video frame, of the data unit to which the data packet of the terminal belongs, and the user level of the terminal, not only the position of the video frame in the GoP needs to be considered, but further, the importance of the data unit may be determined by considering whether the data unit is located in an FOV of the video frame and considering the user level of the terminal. If the importance of the data unit is determined based on the position, in the video frame, of the data unit to which the data packet of the terminal belongs and the user level of the terminal, not only whether the data unit is located in an FOV needs to be considered, but further, the importance of the data unit may be determined based on the user level of the terminal.

In embodiments of this application, the size level of the data unit to which the data packet of the terminal belongs may be used to represent a size of the data unit. There is a correspondence between the size level of the data unit and a first ratio. The correspondence may be in a table form, an array form, or another implementation form. The size level of the data unit may be determined based on the correspondence and the first ratio.

For example, the correspondence is in a table form. Table 5 shows a correspondence between a size level of a data unit and a first ratio. As shown in Table 5, after the first ratio is obtained through calculation, the size level of the data unit may be obtained by querying Table 5 by using the first ratio as an index. For example, assuming that the first ratio obtained through calculation is 0.5, it may be determined, by querying Table 5, that the size level of the data unit is "00".

TABLE 5

| Range of the first ratio | Size level of the data unit |
| --- | --- |
| 0 to 1 | 00 |
| 1 to 1.5 | 01 |
| 1.5 to 2 | 10 |
| >2 | 11 |

It should be noted that Table 5 is an example table. Table 5 is used to more clearly describe a correspondence between the first ratio and a size level of a data unit, and does not constitute a limitation on a value of the size level of the data unit. For example, a quantity of bits corresponding to the size level of the data unit is not limited. Two bits "00" may be used to represent the size level of the data unit corresponding to the first ratio in the range of [0, 1], or three bits "000" may be used to represent the size level of the data unit corresponding to the first ratio in the range of [0, 1]. In addition, in Table 5, the value of the size level of the data unit is in a negative correlation relationship with a data amount of the data unit. A smaller value of the size level of the data unit indicates a larger data amount of the data unit, and a larger value of the size level of the data unit indicates a smaller data amount of the data unit. It should be understood that a relationship between the value of the size level of the data unit and the data amount of the data unit in Table 5 is merely an example, where the value of the size level of the data unit may be set to be in a positive correlation relationship with the data amount of the data unit, and this is not limited.

The first ratio=A/B. A may be the size of the data unit to which the data packet of the terminal belongs. B may be an average value of sizes of data units successfully transmitted by the terminal or an average value of sizes of data units of a video source corresponding to the data packet of the terminal. The following describes a manner of determining the first ratio.

In an example, the first ratio may be obtained through calculation based on a ratio of the size of the data unit to the average value of sizes of data units successfully transmitted by the terminal. For example, the first ratio may satisfy the following formula:

$$\text{First ratio} = \frac{\text{Size of a data unit to which a data packet belongs}}{\substack{\text{Average value of sizes of data} \\ \text{units successfully transmitted by a terminal}}}$$

For example, a quantity of successfully transmitted data units of the terminal may be counted, a ratio of a total data amount value of successfully transmitted data units to the total quantity of successfully transmitted data units is calculated to obtain the average value of sizes of successfully transmitted data units, and the size of the data unit to which the data packet of the terminal belongs and the calculated average value of sizes of successfully transmitted data units are substituted into the foregoing formula to obtain the first ratio.

In another example, the first ratio may be obtained through calculation based on a ratio of the size of the data unit to the average value of sizes of data units of a video source corresponding to the data packet of the terminal. For example, the first ratio may satisfy the following formula:

$$\text{First ratio} = \frac{\text{Size of a data unit to which a data packet belongs}}{\substack{\text{Average value of sizes of data units of a video} \\ \text{source corresponding to the data packet of a terminal}}}$$

The average value of sizes of data units of a video source corresponding to the data packet of the terminal may be a ratio of a data amount of all data units included in the type of video source to a total quantity of the data units included in the video source. The average value of sizes of the data units of the video source corresponding to the data packet of the terminal may be determined in advance. For example, when there are a plurality of types of video sources, for each video source, statistics on an average value of sizes of data units of the video source of the type are collected in advance based on one or more of information such as a code control manner, a resolution, and a GoP of the video source, and a correspondence between the video source and the average value of sizes of the data units of the video source is locally stored. Subsequently, after a type of the video source corresponding to the data packet of the terminal is determined, the average value of sizes of the data units of the video source corresponding to the data packet of the terminal is obtained based on the locally stored correspondence between the video source and the average value of sizes of the data units of the video source, and the size of the data unit to which the data packet of the terminal belongs and the average value of sizes of the data units of the video source corresponding to the data packet of the terminal are substituted into the foregoing formula to obtain the first ratio.

In embodiments of this application, the scheduling priority of the terminal may be used to represent a sequence/time of scheduling the terminal in a plurality of terminals that are to be scheduled by an access network device and that occupy a same transmission resource. There is a positive correlation correspondence between the scheduling priority of the terminal and the sequence/time of scheduling the terminal. A higher scheduling priority of the terminal indicates that the terminal is scheduled earlier, and a lower scheduling priority of the terminal indicates that the terminal is scheduled later. For example, there are two terminals (terminal 1 and terminal 2) are to be scheduled by base station 1. If a scheduling priority of terminal 1 is greater than a scheduling priority of terminal 2, terminal 1 is scheduled at time 1, and terminal 2 is scheduled at time 2, where time 1 is earlier than time 2.

The following describes the scheduling transmission method provided in embodiments of this application with reference to the accompanying drawings of this specification. It should be noted that with evolution of a communication system and emergence of a new service scenario, the technical solutions provided in embodiments of this application are also applicable to similar technical problems. In addition, a communication system and a service scenario that are described in embodiments of this application are intended to describe the technical solutions in embodiments of this application more clearly, and do not constitute a limitation on the technical solutions provided in embodiments of this application.

The scheduling transmission method provided in embodiments of this application may be applied to a communication system shown in FIG. 2. As shown in FIG. 2, the communication system may include one or more terminals and access network devices. Further, the communication system may include an application server (app server, AS), a core network device/fixed network, and the like. The application server or another terminal may transmit data with the terminal via the access network device/fixed network. The one or more terminals are located in a cell covered by the access network device, and the one or more terminals may be terminals to be scheduled by the access network device. It should be noted that the scheduling described in embodiments of this application may include uplink scheduling or downlink scheduling. The uplink scheduling may mean that the access network device schedules the terminal to send uplink data to the application server/another terminal, and the downlink scheduling may mean that the access network device schedules, to the terminal, downlink data sent by the application server/another terminal.

The following describes network elements in the communication system shown in FIG. 2.

The access network device is mainly configured to implement functions such as resource scheduling, radio resource management, and radio access control of the terminal. For example, the access network device may be configured to: determine a scheduling priority of the terminal based on an instantaneous rate of the terminal and a type of a first service of the terminal, and transmit the first service with the terminal based on the scheduling priority of the terminal. Specifically, the access network device may be any node of a small base station, a wireless access point, a transmission reception point (transmission reception point, TRP), a transmission point (transmission point, TP), and another access node. The access network device may be any device that has a wireless transceiver function. The access network device may include but is not limited to: an evolved access network device (evolved NodeB, NodeB, eNB, or e-NodeB) in long term evolution (long term evolution, LTE), an access network device (gNodeB or gNB) or a transceiver point in new radio (new radio, NR), an evolved access network device after the 3rd generation partnership project (3rd generation partnership project, 3GPP), a wireless fidelity (wireless-fidelity, Wi-Fi) access point in a Wi-Fi system, a wireless relay node, a wireless backhaul node, and the like.

The terminal is a device with a wireless transceiver function. The terminal may be deployed on land, including indoor or outdoor, handheld, wearable, or vehicle-mounted; may be deployed on a water surface (for example, on a ship); or may be deployed in the air (for example, on an airplane, a balloon, or a satellite). The terminal may be a mobile phone (mobile phone), a tablet computer (Pad), a computer with a wireless transceiver function, a VR device, an AR device, XR glasses, a television, a smart screen/electronic tablet, a wireless terminal in industrial control (industrial control), a vehicle-mounted terminal device, a wireless terminal in self driving (self driving), a wireless terminal in remote medical (remote medical), a wireless terminal in smart grid (smart grid), a wireless terminal in transportation safety (transportation safety), a wireless terminal in a smart city (smart city), a wireless terminal in a smart home (smart home), a wearable terminal device, or the like. An application scenario is not limited in embodiments of this application. The terminal sometimes may also be referred to as a terminal device, user equipment (user equipment, UE), an access terminal device, a vehicle-mounted terminal, an industrial control terminal, a UE unit, a UE station, a mobile station, a remote station, a remote terminal device, a mobile device, a UE device, a terminal device, a wireless communication device, a UE agent, a UE apparatus, or the like. The terminal may be fixed or movable.

The application server is mainly configured to provide a service for the terminal, for example, provide an XR service. The application server may also be replaced with an application function (application function, AF) or another name, and this is not limited.

The core network device may be configured to complete functions such as registration, connection, and session management. The core network device may include a user plane function (user plane function, UPF), a session management network element (for example, a session management function (session management function, SMF)), a mobility management network element (for example, an access and mobility management function (access and mobility management function, AMF)), and the like.

The fixed network may be configured to implement functions such as connection and data transmission. The fixed network may be a Wi-Fi network, an Ethernet, or the like.

It should be noted that FIG. 2 is merely an example diagram of an architecture. In addition to the functional units shown in FIG. 2, the system may further include another functional network element, for example, an operation and management (operation and management, O&M) network element. This is not limited in embodiments of this application. In addition, names of the devices in FIG. 2 are not limited. In addition to the names shown in FIG. 2, the devices may also have other names. For example, the names may be replaced with names of network elements having same or similar functions. This is not limited.

The communication system shown in FIG. 2 may be a 3GPP communication system, for example, a 4th generation (4th generation, 4G) communication system or an LTE system, or may be a 5th generation (5th generation, 5G) communication system, an NR system, a new radio-vehicle-to-everything (new radio-vehicle-to-everything, NR-V2X) communication system, an internet of things system, or another next generation communication system, or may be a non-3GPP communication system, for example, a Wi-Fi system, or a hybrid networking system of a Wi-Fi system and the foregoing network system. This is not limited.

For example, the communication system shown in FIG. 2 is a 5G communication system. As shown in FIG. 3a, a network element or an entity corresponding to the application server in FIG. 2 may be a server in the 5G communication system. The core network device in FIG. 2 may correspond to a network exposure function (network exposure function, NEF), a policy control function (policy control function, PCF), a UPF, an SMF, or the like in the 5G communication system. A network element or an entity corresponding to the access network device in FIG. 2 may be a gNB in the 5G communication system, and a network element or an entity corresponding to the terminal may be UE in the 5G communication system. In the 5G communication system, a network element may be connected to a network element through a next generation (next generation, NG) interface (or an N interface for short). The server may send downlink data to the gNB through an N6 transmission tunnel between the server and the UPF and an N3 transmission tunnel between the UPF and the gNB. The gNB sends the downlink data to the UE through an NR air interface.

In a possible design, the gNB may directly send downlink data to the UE through the NR air interface. In another possible design, the gNB may send the downlink data to the UE through a trunk link. For example, FIG. 3b is a schematic diagram of another 5G communication system. A difference between the 5G communication system shown in FIG. 3b and the communication system shown in FIG. 3a lies in that one or more relay nodes (one relay node is used as an example for description in FIG. 3b) exist between a gNB and UE, and the gNB and the UE may transmit data via the one or more relay nodes. The relay (relay) node may be a small cell similar to an NR base station (gNodeB), for example, an integrated access and backhaul (integrated access and backhaul, IAB) base station or a device such as a terminal device or a terminal head-mounted display XR glasses.

Figure 3C:
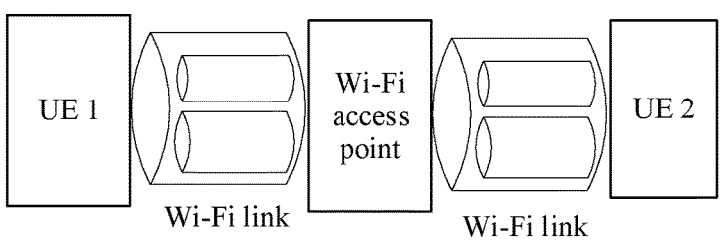

For example, the communication system shown in FIG. 2 is a Wi-Fi system. FIG. 3c is a schematic diagram of the Wi-Fi system. As shown in FIG. 3c, the Wi-Fi system may include: UE 1, UE 2, and a Wi-Fi access point. A network element or an entity corresponding to the access network device in FIG. 2 may be the Wi-Fi access point in the Wi-Fi system, and a network element or an entity corresponding to the terminal in FIG. 2 may be the UE in the Wi-Fi system. As shown in FIG. 3c, UE 1 and UE 2 may transmit data to each other via the Wi-Fi access point. The Wi-Fi access point may be a Wi-Fi router or a set-top box. For example, UE 1 is a mobile phone, and UE 2 is a television or a smart screen/electronic tablet. The mobile phone may project a picture to the television or the smart screen/electronic tablet via the Wi-Fi router or the set-top box.

Figure 3D:
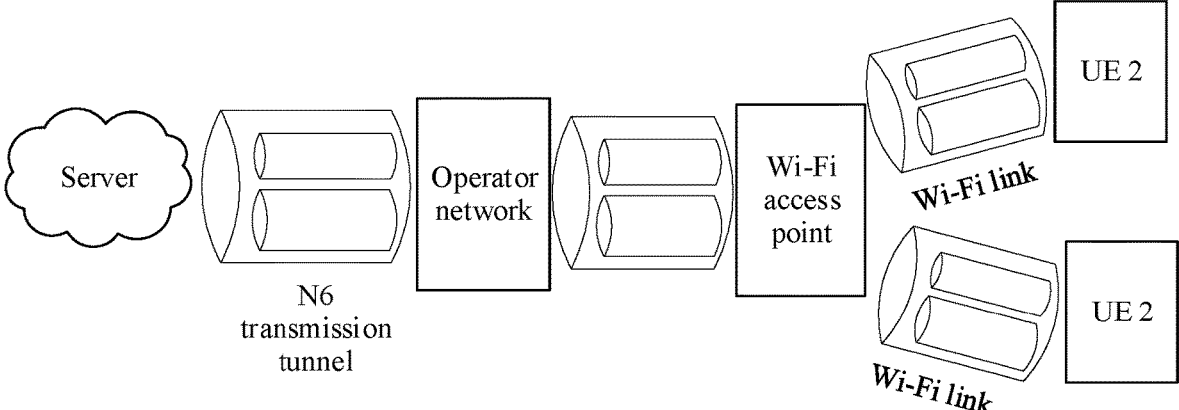

For example, the communication system shown in FIG. 2 is a hybrid networking system. FIG. 3d is a schematic diagram of the hybrid networking system. As shown in FIG. 3d, the system may include a server, an operator network, a Wi-Fi access point, and one or more UEs. A network element or an entity corresponding to the application server in FIG. 2 may be the server in the system, a network element or an entity corresponding to the access network device in FIG. 2 may be the Wi-Fi access point in the system, and a network element or an entity corresponding to the terminal in FIG. 2 may be the UE in the system. The server may send data of an XR service to the Wi-Fi access point via the operator network, and the Wi-Fi access point transmits the data to UE 1 (for example, an XR device) and projects the data to UE 2 (for example, a television, a smart screen, or an electronic tablet).

Figure 4:
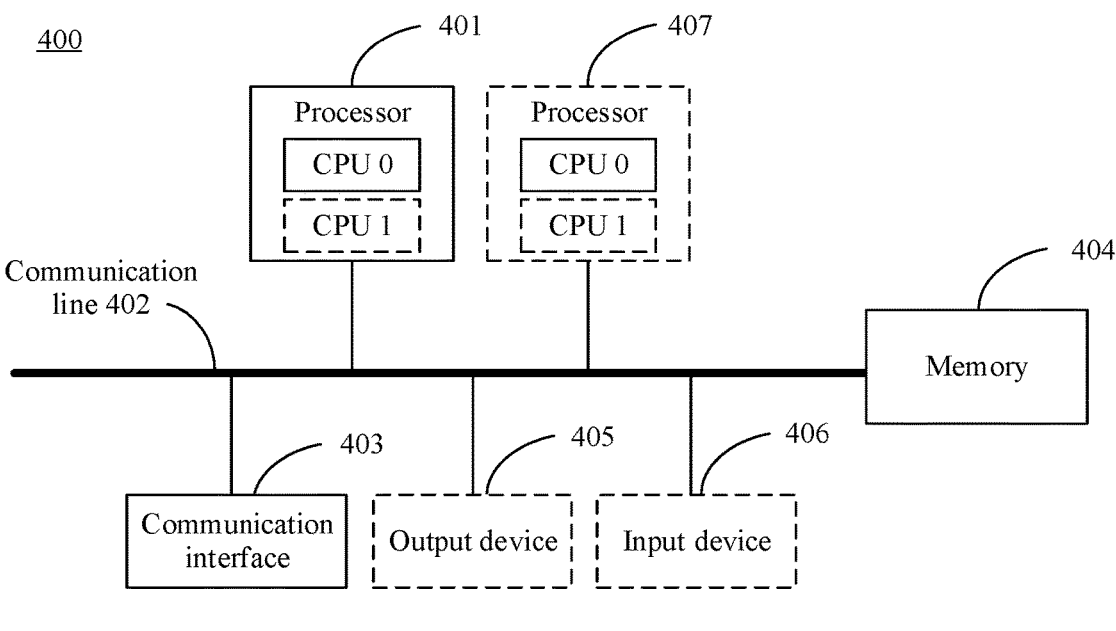
FIG. 4 is a schematic diagram of a communication apparatus according to an embodiment of this application.

During specific implementation, the network elements shown in FIG. 2, for example, the terminal and the access network device, may use a composition structure shown in FIG. 4 or include components shown in FIG. 4. FIG. 4 is a schematic composition diagram of a communication apparatus 400 according to an embodiment of this application. When the communication apparatus 400 has a function of the access network device in embodiments of this application, the communication apparatus 400 may be an access network device or a chip or a system-on-chip in the access network device.

As shown in FIG. 4, the communication apparatus 400 may include a processor 401, a communication line 402, and a communication interface 403. Further, the communication apparatus 400 may include a memory 404. The processor 401, the memory 404, and the communication interface 403 may be connected to each other through the communication line 402.

The processor 401 may be a central processing unit (central processing unit, CPU), a general-purpose network processor (network processor, NP), a digital signal processor (digital signal processor, DSP), a microprocessor, a microcontroller, a programmable logic device (programmable logic device, PLD), or any combination thereof. The processor 401 may alternatively be any other apparatus having a processing function, for example, a circuit, a component, or a software module.

The communication line 402 is configured to transmit information between the components included in the communication apparatus 400.

The communication interface 403 is configured to communicate with another device or another communication network. The another communication network may be an Ethernet, a radio access network (radio access network, RAN), a wireless local area network (wireless local area network, WLAN), or the like. The communication interface 403 may be a radio frequency module, a transceiver, or any apparatus that can implement communication. In this embodiment of this application, an example in which the communication interface 403 is a radio frequency module is used for description. The radio frequency module may include an antenna, a radio frequency circuit, and the like. The radio frequency circuit may include a radio frequency integrated chip, a power amplifier, and the like.

The memory 404 is configured to store instructions. The instructions may be a computer program.

The memory 404 may be a read-only memory (read-only memory, ROM) or another type of static storage device that can store static information and/or instructions, or may be a random access memory (random access memory, RAM) or another type of dynamic storage device that can store information and/or instructions, or may be an electrically erasable programmable read-only memory (electrically erasable programmable read-only memory, EEPROM), a compact disc read-only memory (compact disc read-only memory, CD-ROM) or other optical disk storage, optical disc storage, or a magnetic disk storage medium or another magnetic storage device. The optical disc storage includes a compact disc, a laser disc, an optical disc, a digital versatile disc, a Blu-ray disc, and the like.

It should be noted that the memory 404 may exist independently of the processor 401, or may be integrated into the processor 401. The memory 404 may be configured to store instructions, program code, some data, or the like. The memory 404 may be located inside the communication apparatus 400, or may be located outside the communication apparatus 400. This is not limited. The processor 401 is configured to execute the instructions stored in the memory 404, to implement the scheduling transmission method provided in the following embodiments of this application.

In an example, the processor 401 may include one or more CPUs, for example, CPU 0 and CPU 1 in FIG. 4.

In an optional implementation, the communication apparatus 400 includes a plurality of processors. For example, the communication apparatus 400 may further include a processor 407 in addition to the processor 401 in FIG. 4.

In an optional implementation, the communication apparatus 400 further includes an output device 405 and an input device 406. The input device 406 is a keyboard, a mouse, a microphone, a joystick, or the like, and the output device 405 is a device such as a display or a speaker (speaker).

It should be noted that the communication apparatus 400 may be a desktop computer, a portable computer, a network server, a mobile phone, a tablet computer, a wireless terminal, an embedded device, a chip system, or a device having a structure similar to that in FIG. 4. In addition, the composition structure shown in FIG. 4 does not constitute a limitation on the communication apparatus. In addition to the components shown in FIG. 4, the communication apparatus may include more or fewer components than those shown in the figure, or some components may be combined, or different component arrangements may be used.

In embodiments of this application, the chip system may include a chip, or may include a chip and another discrete component.

The following describes the scheduling transmission method provided in embodiments of this application with reference to the communication system shown in FIG. 2. Devices in the following embodiments may have the components shown in FIG. 4, and actions, terms, and the like in embodiments may be mutually referenced. In embodiments, names of messages exchanged between devices, names of parameters in the messages, or the like are merely examples, and may alternatively be other names during specific implementation. This is not limited.

Figure 5:
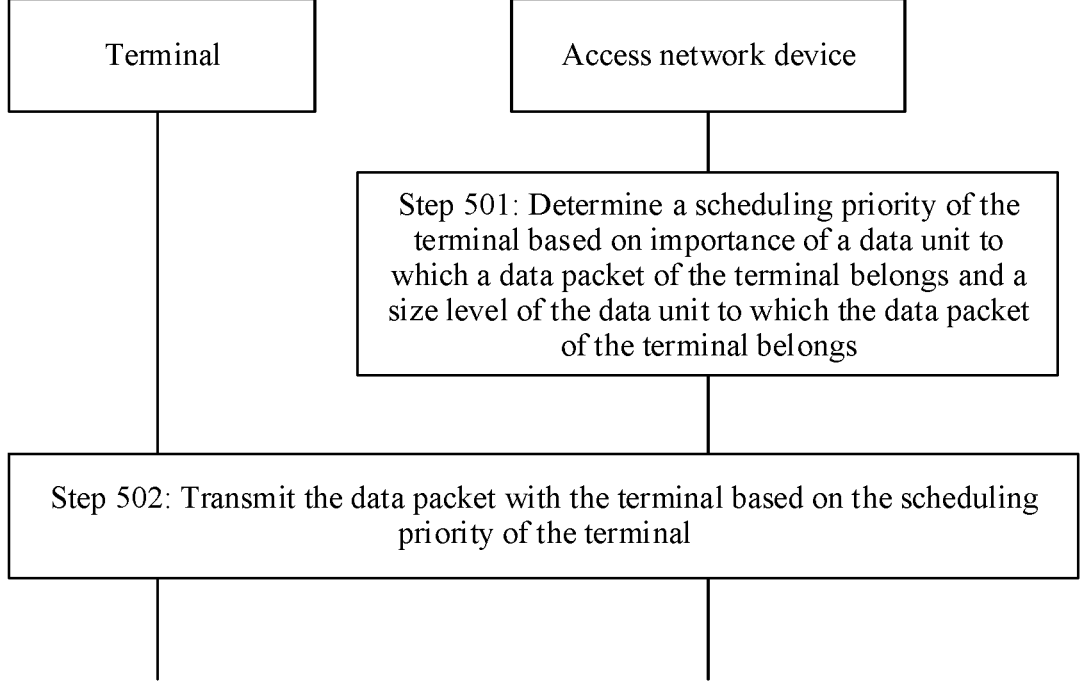
FIG. 5 is a flowchart of a scheduling transmission method according to an embodiment of this application.

FIG. 5 shows a scheduling transmission method according to an embodiment of this application. As shown in FIG. 5, the method may include the following steps.

Step 501: An access network device determines a scheduling priority of a terminal based on importance of a data unit to which a data packet of the terminal belongs and a size level of the data unit to which the data packet of the terminal belongs.

The access network device may be the access network device in FIG. 2, and the terminal may be any terminal connected to the access network device in the communication system shown in FIG. 2.

In embodiments of this application, from a perspective of a transmission direction of a data packet, the data packet of the terminal may be a downlink data packet sent by an application server/another terminal to the terminal via the access network device, or may be an uplink data packet sent (or referred to as to be sent) by the terminal to an application server/another terminal via the access network device. From a perspective of a service type of the data packet, the data packet of the terminal may be a data packet of a service whose target video frame correctness rate is greater than a threshold. The service may be an XR service or another service, and this is not limited. For example, the data packet of the terminal is a downlink data packet of the XR service. The application server may divide a picture frame (or referred to as an image frame) of the XR service into a plurality of data units, distribute picture content corresponding to each data unit into a plurality of data packets, and send the plurality of data packets to the access network device, and the access network device sends the data packets to the terminal.

For related descriptions of the importance (or referred to as an importance coefficient (importance coefficient)) of the data unit to which the data packet of the terminal belongs and the size level (size level) of the data unit to which the data packet of the terminal belongs, refer to the foregoing descriptions. Details are not described again. When the data packet of the terminal is the uplink data packet sent (or to be sent) by the terminal to the application server/another terminal via the access network device, before step 501, the terminal may indicate, to the access network device based on a signaling message, the importance of the data unit to which the data packet of the terminal belongs and the size level of the data unit to which the data packet of the terminal belongs, where the signaling message may be radio resource control (radio resource control, RRC) signaling or media access control control element (media access control control element, MAC CE) signaling. When the data packet of the terminal is the downlink data packet sent by the application server/the another terminal to the terminal via the access network device, the access network device may obtain, in the following Manner 1 or Manner 2, the importance of the data unit to which the data packet of the terminal belongs and the size level of the data unit to which the data packet of the terminal belongs.

Manner 1: The importance of the data unit to which the data packet of the terminal belongs and the size level of the data unit to which the data packet of the terminal belongs may be obtained by the application server through calculation in the foregoing manner, and indicated to the access network device.

For example, when sending the data packet of the terminal to the terminal, the application server may carry, in the data packet of the terminal, first information that indicates the importance of the data unit to which the data packet belongs and the size level of the data unit to which the data packet of the terminal belongs. After receiving the data packet of the terminal, the access network device determines, based on the first information in the data packet of the terminal, the importance of the data unit to which the data packet of the terminal belongs and the size level of the data unit to which the data packet of the terminal belongs.

Figure 6:
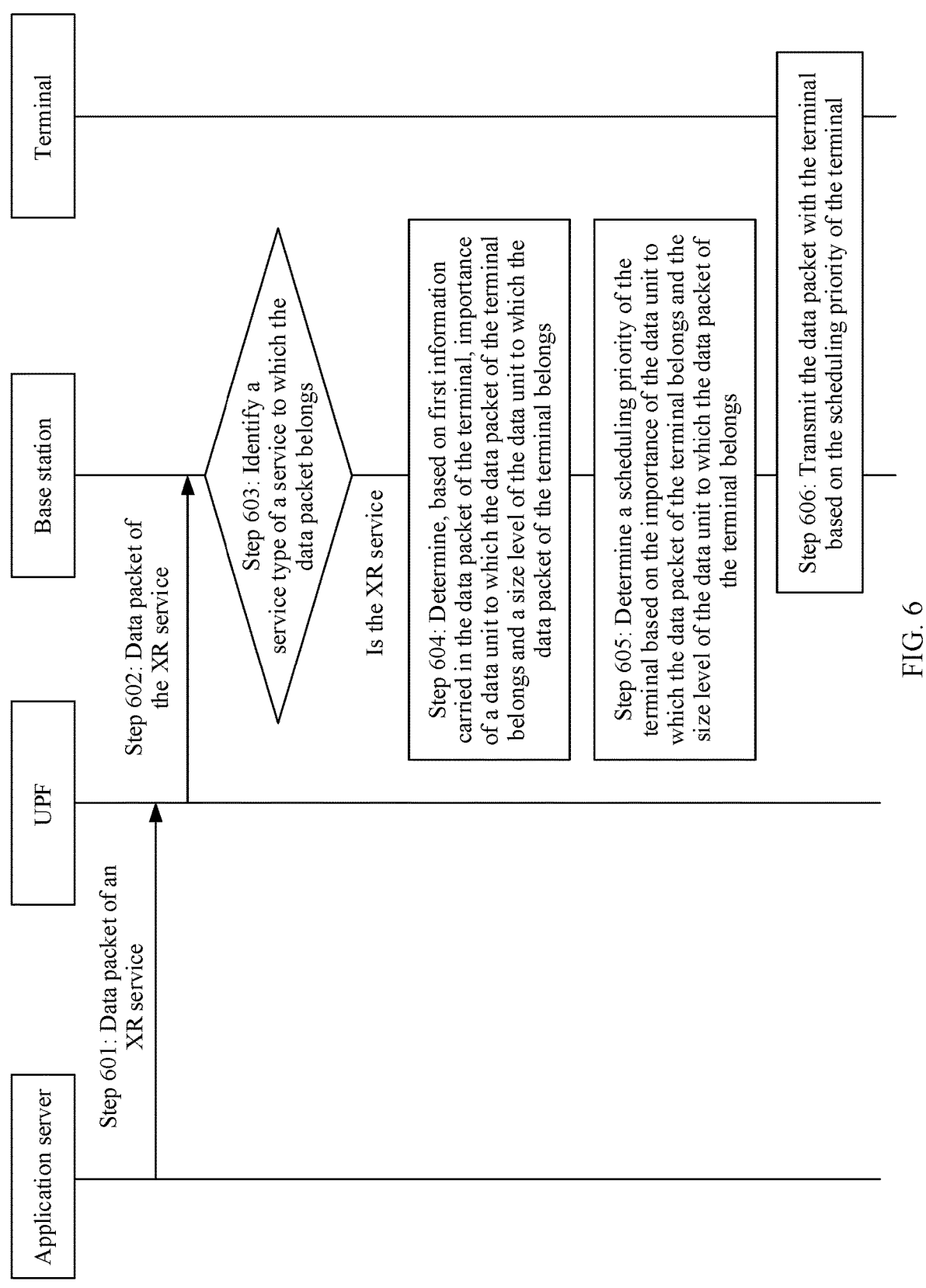
FIG. 6 is a flowchart of another scheduling transmission method according to an embodiment of this application.

Specifically, for this process, refer to descriptions in the embodiment corresponding to FIG. 6.

Manner 2: The access network device may obtain, through calculation based on integrity transmission of the data unit, the importance of the data unit to which the data packet belongs and the size level of the data unit to which the data packet of the terminal belongs.

For example, when the data unit is a video frame, the application server may carry, in the data packet, the second information that indicates the video frame to which the data packet of the terminal belongs, and indicate the second information to the access network device. When it is assumed that integrity transmission of the video frame is performed, the access network device determines, based on the second information, the importance of the data unit to which the data packet of the terminal belongs and the size level of the data unit to which the data packet of the terminal belongs. Specifically, for this process, refer to descriptions in the embodiment corresponding to FIG. 8.

For another example, when the data unit is a slice or a tile, the application server may carry third information in the data packet of the terminal. After receiving the data packet of the terminal, the access network device may determine, based on the third information carried in the data packet of the terminal, the importance of the data unit to which the data packet of the terminal belongs and the size level of the data unit to which the data packet of the terminal belongs.

The third information may indicate a data unit to which the data packet of the terminal belongs and a total quantity of data packets included in the data unit. Further, based on different reference factors for determining the importance of the data unit to which the data packet of the terminal belongs, the third information may further indicate other information. Examples are as follows.

When the importance of the data unit to which the data packet of the terminal belongs is determined based on a position, in the video frame, of the data unit to which the data packet of the terminal belongs, the third information may further indicate whether the data unit to which the data packet of the terminal belongs is located in an FOV of the video frame. When the importance of the data unit to which the data packet of the terminal belongs is determined based on a position, in the video frame, of the data unit to which the data packet of the terminal belongs and a position of the video frame in a GoP, the third information may further indicate a video frame, in the GoP, to which the data unit belongs and whether the data unit to which the data packet of the terminal belongs is located in an FOV of the video frame. When the importance of the data unit to which the data packet of the terminal belongs is determined based on a position, in a GoP, of the video frame corresponding to the data unit to which the data packet of the terminal belongs, the third information may further indicate a video frame, in the GoP, to which the data unit belongs.

It should be understood that in the foregoing Manner 1 and Manner 2, if the importance of the data unit to which the data packet of the terminal belongs is further determined based on a user level of the terminal, before step 501, the access network device may further obtain the user level of the terminal. For example, the user level of the terminal may be indicated by the application server to the access network device, or may be indicated by the terminal to the access network device, or may be obtained by the access network device from locally stored context information of the terminal.

For example, the importance of the data unit to which the data packet of the terminal belongs, the size level of the data unit to which the data packet of the terminal belongs, and the scheduling priority of the terminal may satisfy the following formula (2):

$$\text{Scheduling priority of a terminal} = f(\text{importance of a data unit, size level of the data unit}) \quad \text{formula (2)}$$

An implementation form of the function $f$ in formula (2) is not limited in embodiments of this application, provided that the function can implement the following correspondence: Higher importance and a smaller size of the data unit to which the data packet of the terminal belongs indicate a higher scheduling priority of the terminal. Lower importance and a larger size of the data unit to which the data packet of the terminal belongs indicates a lower scheduling priority of the terminal. When the importance of the data unit to which the data packet of the terminal belongs is relatively low and the data unit to which the data packet of the terminal belongs is relatively small, or when the importance of the data unit to which the data packet of the terminal belongs is relatively high and the data unit to which the data packet of the terminal belongs is relatively large, a medium scheduling priority is configured for the terminal.

In an example, a specific form of formula (2) may be shown in the following formula (3):

$$\text{Scheduling priority of a terminal} = \quad \text{formula (3)}$$

$$f(\text{importance of a data unit, size level of the data unit}) =$$

$$f1(\text{importance of a data unit}) * f2(\text{size level of the data unit})$$

The symbol "*" in formula (3) represents multiplication. A higher value of the function $f1$ or the function $f2$ indicates a higher scheduling priority of the terminal. By contrast, a lower value of the function $f1$ or the function $f2$ indicates a lower scheduling priority of the terminal.

An implementation form of the function $f1$ is not limited in embodiments of this application, provided that the function can implement the following correspondence: There is a positive correlation between a value of the function $f1$ and the importance of the data unit to which the data packet of the terminal belongs, and higher importance of the data unit to which the data packet of the terminal belongs indicates a larger value of the function $f1$. For example, the function $f1$ may be a monotonically increasing unary linear function, an exponential function, or another function. For example, $f1(x)=2x$, where x is an input parameter of the function $f1$, and x may be, for example, the importance of the data unit to which the data packet of the terminal belongs.

An implementation form of the function $f2$ is not limited in embodiments of this application, provided that the function can implement the following correspondence: There is a negative correlation between a value of the function $f2$ and the size level of the data unit to which the data packet of the terminal belongs, a larger data unit to which the data packet of the terminal belongs indicates a smaller value of the function $f2$, and a smaller data unit to which the data packet of the terminal belongs indicates a larger value of the function $f2$. For example, the function $f2$ may be a monotonically decreasing linear function or another function. For example, $$f2(x) = \frac{1}{2X},$$

where x is an input parameter of the function $f2$, and x may be, for example, the size level of the data unit to which the data packet of the terminal belongs.

In addition to the importance of the data unit to which the data packet of the terminal belongs and the size level of the data unit to which the data packet of the terminal belongs, the scheduling priority of the terminal may be further determined based on another parameter such as a first parameter. The first parameter may include but is not limited to one or more of the following: a ratio of transmitted data of the data unit to which the data packet of the terminal belongs, an estimated transmission delay of a remaining data packet of the data unit to which the data packet of the terminal belongs, an instantaneous rate of the terminal, or a historical transmission rate of the terminal.

The ratio of transmitted data of the data unit to which the data packet of the terminal belongs may be a ratio of a quantity of transmitted data packets of the data unit to which the data packet of the terminal belongs to a total quantity of data packets included in the data unit, or may be a ratio of an amount of transmitted data of the data unit to which the data packet of the terminal belongs to a total data amount of the data unit.

The estimated transmission delay of the remaining data packet of the data unit to which the data packet of the terminal belongs may be time required for transmitting the remaining data packet (remaining data) of the data unit. For example, the estimated transmission delay may be obtained by dividing a data amount of the remaining data packet of the data unit to which the data packet of the terminal belongs by the historical transmission rate of the terminal. The historical transmission rate may be a ratio of a quantity of transmitted bits in a historical time period to a value of the time period.

For example, the first parameter includes the ratio $$\left(\frac{\text{sent data}}{\text{all data}}\right)$$

of transmitted data packets of the data unit to which the data packet of the terminal belongs, the estimated transmission delay (delay) of the remaining data packet of the data unit to which the data packet of the terminal belongs, the instantaneous rate $R_{instant}$ of the terminal, and the historical transmission rate $R_{history}$ of the terminal. The importance importance coefficient of the data unit to which the data packet of the terminal belongs, the size level size level of the data unit to which the data packet of the terminal belongs, the first parameter, and the scheduling priority of the terminal may satisfy the following formula (4):

$$\text{Scheduling priority of a terminal} = M\left(\text{importance coefficient,} \right. \quad \text{formula (4)}$$
$$\left. \text{size level,} \frac{\text{sent data}}{\text{all data}}, \text{delay,} \frac{R_{instant}}{R_{history}}\right)$$

An implementation form of the function $f$ in formula (4) is not limited in embodiments of this application, provided that the function can implement the following correspondence: There is a positive correlation correspondence between the importance of the data unit to which the data packet of the terminal belongs and the scheduling priority of the terminal. Higher importance of the data unit to which the data packet of the terminal belongs indicates a higher scheduling priority of the terminal. There is a negative correlation correspondence between the size level of the data unit to which the data packet of the terminal belongs and the scheduling priority of the terminal, and a smaller data unit to which the data packet of the terminal belongs indicates a higher scheduling priority of the terminal. There is a positive correlation correspondence between the ratio $$\frac{\text{sent data}}{\text{all data}}$$

of transmitted data and the scheduling priority of the terminal, and a larger ratio of transmitted data indicates a higher scheduling priority of the terminal. There is a positive correlation correspondence between the estimated transmission delay and the scheduling priority of the terminal, and a longer estimated transmission delay indicates a higher scheduling priority of the terminal. There is a positive correlation correspondence between the scheduling priority of the terminal and the ratio $$\frac{R_{instant}}{R_{history}}$$

of the instantaneous rate of the terminal to the historical transmission rate of the terminal, and a larger value of $$\frac{R_{instant}}{R_{history}}$$

indicates a higher scheduling priority of the terminal.

In an example, a specific implementation form of formula (4) may be shown in the following formula (5).

$$\begin{aligned}
\text{Scheduling priority of a terminal} = \quad &\text{formula (5)} \\
M\bigg(\text{importance coefficient, size level, } \frac{\text{sent data}}{\text{all data}}, \\
\text{delay, } \frac{R_{instant}}{R_{history}}\bigg) = M1(\text{importance coefficient}) * M2 \\
(\text{size level}) * M3\left(\frac{\text{sent data}}{\text{all data}}\right) * M4(\text{delay}) * M5\left(\frac{R_{instant}}{R_{history}}\right)
\end{aligned}$$

The symbol "*" in formula (5) represents multiplication. A higher value of the function M1, the function M2, the function M3, the function M4, and the function M5 indicates a higher scheduling priority of the terminal. By contrast, a lower value of the function M1, the function M2, the function M3, the function M4, and the function M5 indicates a lower scheduling priority of the terminal.

Specifically, the function M1 may be a monotonically increasing linear function or an exponential function. For example, M1(x)=2x, where x is the importance of the data unit to which the data packet of the terminal belongs, and higher importance of the data unit to which the data packet of the terminal belongs indicates a larger value of the function M1(x). The function M2 may be a monotonically decreasing linear function. For example, $$M2(x) = \frac{1}{2X},$$

where x is the size level of the data unit to which the data packet of the terminal belongs, and a smaller data unit to which the data packet of the terminal belongs indicates a larger value of the function M2(x). The function M3 may be a monotonically increasing linear function or an exponential function. For example, M3(x)=2x, where x is the ratio $$\frac{\text{sent data}}{\text{all data}}$$

of transmitted data, and a higher ratio $$\frac{\text{sent data}}{\text{all data}}$$

of transmitted data indicates a larger value of the function M3(x). The function M4 may all data be a monotonically increasing linear function or an exponential function. For example, M4(x)=2x, where x is the estimated transmission delay, and a longer estimated transmission delay indicates a larger value of the function M4(x). The function M5 may be a monotonically increasing linear function or an exponential function. For example, M5(x)=2x, where x is the ratio $$\frac{R_{instant}}{R_{history}}$$

of the instantaneous rate of the terminal to the historical transmission rate of the terminal. A higher ratio $$\frac{R_{instant}}{R_{history}}$$

of the instantaneous rate of the terminal to the historical transmission rate of the terminal indicates a larger value of the function MS(x).

It should be understood that a specific implementation form of formula (4) is not limited to the foregoing formula (5). Alternatively, all or some parameters in the ratio $$\left(\frac{\text{sent data}}{\text{all data}}\right)$$

of transmitted data packets of the data unit to which the data packet of the terminal belongs, the estimated transmission delay (delay) of the remaining data packet of the data unit to which the data packet of the terminal belongs, the instantaneous rate $R_{instant}$ of the terminal, the historical transmission rate $R_{history}$ of the terminal, the importance importance coefficient of the data unit to which the data packet of the terminal belongs, and the size level size level of the data unit to which the data packet of the terminal belongs may be divided into a first part of parameters and a second part of parameters, and the scheduling priority of the terminal may be a product of a function using the first part of parameters as input parameters and a function using the second part of parameters as input parameters. Parameters included in the first part of parameters are different from those included in the second part of parameters.

Step 502: The access network device transmits the data packet with the terminal based on the scheduling priority of the terminal.

For example, if the data packet is the downlink data packet sent by the application server/the another terminal to the terminal, that the access network device transmits the data packet with the terminal based on the scheduling priority of the terminal may include: The access network device sends downlink scheduling information and the data packet to the terminal based on the scheduling priority of the terminal, where the downlink scheduling information is for scheduling the data packet to be sent to the terminal.

If the data packet is the uplink data packet sent by the terminal to the application server or the another terminal, that the access network device transmits the data packet with the terminal based on the scheduling priority of the terminal may include: The access network device sends uplink scheduling information to the terminal based on the scheduling priority of the terminal, and the access network device receives the data packet from the terminal based on the uplink scheduling information, and sends the data packet to the application server/the another terminal, where the uplink scheduling information is for scheduling the data packet sent by the terminal.

Alternatively, in the method shown in FIG. 5, in a scenario in which the data packet of the terminal is the downlink data packet sent by the application server/the another terminal to the terminal, a core network device (such as a UPF) may determine the scheduling priority of the terminal based on the importance of the data unit to which the data packet of the terminal belongs and the size level of the data unit, and indicate the determined scheduling priority to the access network device. For example, the foregoing step 501 may be replaced with: The core network device determines the scheduling priority of the terminal based on the importance of the data unit to which the data packet of the terminal belongs and the size level of the data unit, carries, in the data packet, indication information that indicates the scheduling priority of the terminal, and sends the data packet to the access network device. After receiving the data packet, the access network device obtains the indication information from the data packet, determines the scheduling priority of the terminal based on the indication information, and performs the process shown in step 502 based on the scheduling priority of the terminal.

A manner in which the core network device obtains the importance of the data unit to which the data packet of the terminal belongs and the size level of the data unit, and determines the scheduling priority of the terminal based on the obtained importance of the data unit to which the data packet of the terminal belongs and the size level of the data unit is the same as an execution process of the access network device in step 501, and details are not described again.

Based on the method shown in FIG. 5, the scheduling priority of the terminal may be determined based on the importance of the data unit to which the data packet of the terminal belongs and the size level of the data unit to which the data packet of the terminal belongs, and a terminal whose data unit is important and whose data unit is relatively small is preferentially scheduled to transmit a data packet, so as to maximize a quantity of correctly transmitted video frames of the terminal, ensure correct transmission of the important data unit of the terminal, and recover a complete video picture, thereby improving user experience and system performance.

With reference to FIG. 6, it is assumed that the access network device is a base station, a service to which the data packet belongs is an XR service, the data unit is a video frame, and the core network device is a UPF. The application server sends the downlink data packet to the terminal via the core network device and the access network device. An example is used in which the application server indicates, to the access network device, the importance of the data unit to which the data packet of the terminal belongs and the size level of the data unit to which the data packet of the terminal belongs, and the access network device determines the scheduling priority of the terminal, to describe the scheduling transmission method shown in FIG. 5. It should be understood that, in FIG. 6, the XR service is used as an example for description. For another service whose target video frame correctness rate is greater than a threshold, scheduling transmission may be performed with reference to the method shown in FIG. 6.

FIG. 6 shows another scheduling transmission method according to an embodiment of this application. As shown in FIG. 6, the method may include the following steps.

Step 601: An application server sends a data packet of an XR service of a terminal to a UPF.

The application server may be the server in FIG. 3a, the UPF may be the UPF in FIG. 3a, and the UPF may support transmission of the XR service.

For example, an application layer of the application server may generate a video picture of the XR service, divide picture content corresponding to each video frame included in the video picture into a plurality of pieces, and transfer (or send) the plurality of pieces of picture content corresponding to the video frame, a size level of the video frame, and importance of the video frame to a transfer control protocol/internet protocol (transfer control protocol/internet protocol, TCP/IP) layer of the application server. The TCP/IP layer of the application server encapsulates the picture content and first information to generate the data packet of the XR service (or referred to as a data packet of the terminal), and sends the data packet of the XR service to the UPF via a transport layer of the application server.

The first information may indicate the importance of the video frame and the size level of the video frame. For example, the first information may include the importance of the video frame and the size level of the video frame. Each data packet may carry the first information, or an initial data packet of a data unit carries the first information, and another data packet does not carry the first information, so as to reduce data overheads.

Figure 7A:
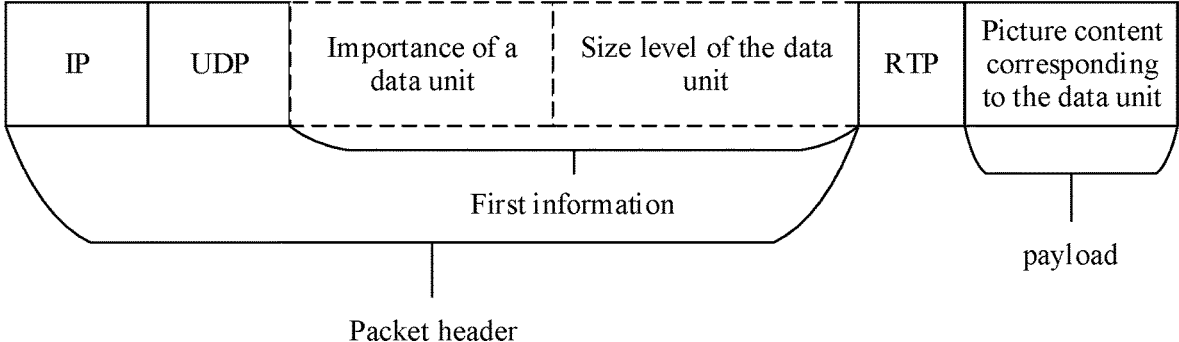
FIG. 7*a* is a schematic diagram of a format of a data packet according to an embodiment of this application.

For example, FIG. 7a is a schematic diagram of a data packet. As shown in FIG. 7a, the size level of the video frame and the importance of the video frame may be carried in a packet header of the data packet as the first information. For example, the first information is carried between a user plane function (user plane function, UPF) field and a real-time transport protocol (real-time transport protocol, RTP) field in the packet header. A piece of picture content is carried in a payload. In this way, the data packet is obtained through encapsulation. It should be noted that FIG. 7a is merely a figure used as an example. In addition to the fields shown in FIG. 7a, another field such as an IP field may be further included. This is not limited.

The application server may determine the importance of the video frame and the size level of the video frame in the foregoing manner. For example, the application server determines the importance of the video frame based on a position of the video frame in a GoP and/or a user level corresponding to the terminal and Table 1 or Table 4, and determines the size level of the video frame based on a ratio of a size of the video frame to an average value of sizes of video frames successfully transmitted by the terminal and the correspondence shown in Table 5. Specifically, for a determining process, refer to the foregoing descriptions. Details are not described again.

Step 602: The UPF receives the data packet from the application server, and sends a received data packet to a base station.

For example, when a general packet radio service tunneling protocol (general packet radio service tunneling protocol, GTP) is supported between the UPF and the base station, the UPF encapsulates the packet header (header) of the data packet received from the application server into a GTP header and sends the data packet to the base station.

Step 603: The base station receives the data packet from the UPF, and identifies a service type of a service to which the data packet belongs. If the service to which the data packet belongs is the XR service, in other words, the data packet is a data packet of the XR service, step 604 to step 606 are performed; otherwise, an existing procedure is performed, where for example, the data packet of the terminal is directly transmitted to the terminal.

For example, the base station may use any one of the following three manners to identify the service type of the service to which the data packet belongs.

Manner (1.1): The base station determines, based on a transmission characteristic of the received data packet, that the service to which the data packet belongs is the XR service, where the transmission characteristic includes a transmission periodicity and/or an amount of transmitted data. In other words, the base station determines, based on the inherent transmission characteristic of the data packet, the service type of the service to which the data packet belongs.

Manner (1.2): The base station determines, based on a radio bearer for transmitting the data packet and a correspondence between a radio bearer and a service, that the service to which the data packet belongs is the XR service.

The radio bearer may include a data radio bearer (data radio barrier, DRB), and the correspondence between a radio bearer and a service may be preconfigured. For example, DRB 1 may be configured to correspond to service 1, DRB 2 may be configured to correspond to service 2, and DRB 3 may be configured to correspond to the XR service. If the base station determines that the radio bearer for transmitting the data packet of the service to which the data packet belongs is DRB 3, the base station may determine that the service to which the data packet belongs is the XR service.

Manner (1.3): The base station determines, based on a quality of service identifier carried in the data packet and a correspondence between a quality of service identifier and a service, that the service to which the data packet belongs is the XR service.

The quality of service identifier may be a 5QI or a quality of service flow identifier (QoS flow identifier, QFI), and the correspondence between a quality of service identifier and a service may be preconfigured. For example, the quality of service identifier is the QFI. QFI 1 may be configured to correspond to service 1, QFI 2 may be configured to correspond to service 2, and QFI 3 may be configured to correspond to the XR service. If the data packet carries QFI 3, the base station may determine, based on QFI 3, that the service to which the data packet belongs is the XR service.

Step 604: The base station determines, based on the first information carried in the data packet of the terminal, importance of a data unit to which the data packet of the terminal belongs and a size level of the data unit to which the data packet of the terminal belongs.

For example, the base station may decapsulate the received data packet, obtain the first information from the packet header of the data packet, and determine, based on the first information, the importance of the data unit to which the data packet of the terminal belongs and the size level of the data unit.

Step 605: The base station determines a scheduling priority of the terminal based on the importance of the data unit to which the data packet of the terminal belongs and the size level of the data unit to which the data packet of the terminal belongs.

For related descriptions of a size of the data unit to which the data packet of the terminal belongs and the size level of the data unit to which the data packet of the terminal belongs, refer to the foregoing descriptions. For an execution process of step 605, refer to the descriptions in step 501. Details are not described again.

Step 606: The base station transmits the data packet with the terminal based on the scheduling priority of the terminal.

An execution process of step 606 is the same as a scheduling manner of the downlink data packet in step 502, and details are not described.

Alternatively, in the method shown in FIG. 6, a core network device such as the UPF may determine the scheduling priority of the terminal, and indicate the determined scheduling priority to the base station. For example, step 602 to step 605 may be replaced with the following steps: After receiving the data packet, the UPF decapsulates the received data packet, obtains the first information from the data packet, determines the scheduling priority of the terminal based on the importance of the data unit to which the data packet of the terminal belongs and the size level of the data unit that are indicated by the first information, and carries indication information that indicates the scheduling priority of the terminal in the packet header of the data packet. For example, the indication information is used to replace the first information carried in the data packet. The UPF encapsulates the data packet with a GTP packet header, and then sends a data packet to the base station. After receiving the data packet, the base station executes the identification process described in step 603, and after identifying that the service to which the data packet belongs is the XR service, obtains, from the packet header of the data packet, the indication information that indicates the scheduling priority of the terminal. Then, the base station transmits the data packet based on the obtained scheduling priority.

A manner in which the core network device determines the scheduling priority of the terminal is the same as the manner in which the access network device determines the scheduling priority of the terminal in step 501. Details are not described again.

Based on the method shown in FIG. 6, for the XR service, the scheduling priority of the terminal may be obtained through calculation based on the importance of the data unit to which the data packet of the terminal belongs and the size level of the data unit to which the data packet of the terminal belongs, and a terminal whose data unit is important and whose data unit is relatively small is preferentially scheduled to transmit a data packet, to maximize a quantity of correctly transmitted video frames of the terminal, ensure correct transmission of the important data unit of the terminal, and recover a complete video picture, thereby improving user experience and system performance.

Figure 8:
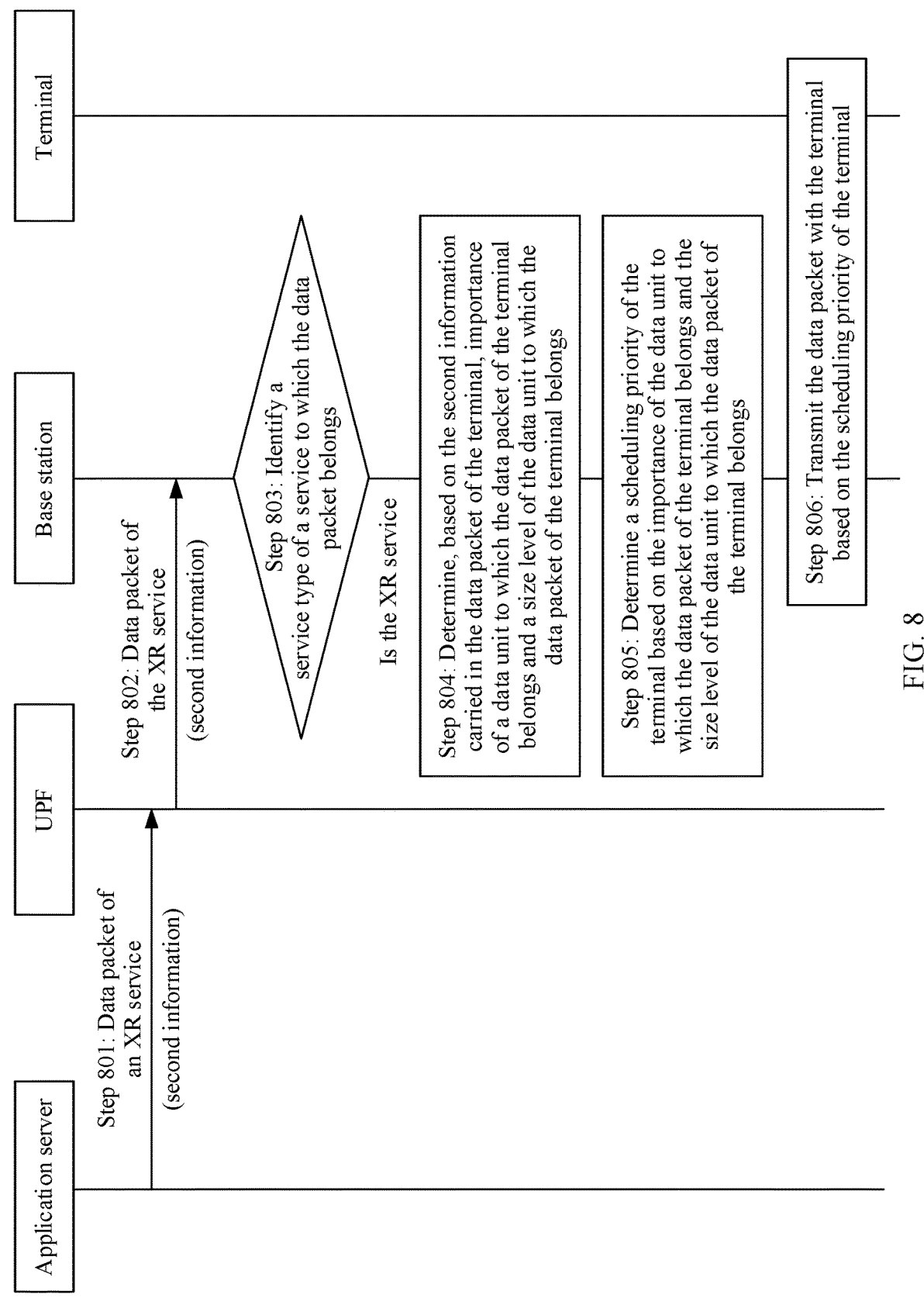
FIG. 8 is a flowchart of still another scheduling transmission method according to an embodiment of this application.

With reference to FIG. 8, it is assumed that the access network device is a base station, the service to which the data packet belongs is an XR service, the data unit is a video frame, and the core network device is a UPF. The application server sends the downlink data packet to the terminal via the core network device and the access network device. For example, the access network device determines, based on integrity transmission of the video frame, the importance of the data unit to which the data packet of the terminal belongs and the size level of the data unit to which the data packet of the terminal belongs, and determines the scheduling priority of the terminal based on the importance of the data unit to which the data packet of the terminal belongs and the size level of the data unit to which the data packet of the terminal belongs, to describe the scheduling transmission method shown in FIG. 5. It should be understood that, in FIG. 8, the XR service is used as an example for description.

For another service whose target video frame correctness rate is greater than a threshold, scheduling transmission may be performed with reference to the method shown in FIG. 8.

FIG. 8 shows another scheduling transmission method according to an embodiment of this application. As shown in FIG. 8, the method may include the following steps.

Step 801: An application server sends a data packet of an XR service of a terminal to a UPF.

The application server may be the server in FIG. 3a, the UPF may be the UPF in FIG. 3a, and the UPF may support transmission of the XR service.

For example, an application layer of the application server may generate a video picture of the XR service, divide picture content corresponding to each video frame included in the video picture into a plurality of pieces, and transfer (or send) the plurality of pieces of picture content corresponding to the video frame and second information to a TCP/IP layer of the application server. The TCP/IP layer of the application server encapsulates the picture content and the second information together to generate the data packet of the XR service (or referred to as a data packet of the terminal), for example, carries the second information in a packet header of the data packet, and carries the picture content in a payload of the data packet.

The second information may indicate a video frame to which the data packet belongs. Each data packet included in the video frame may carry the second information. Further, if a base station does not receive all data packets included in the video frame when step 804 is performed, the second information may further indicate a total quantity of data packets included in the video frame.

For example, when step 804 is performed, the base station receives all data packets included in the video frame, in other words, all the data packets included in the video frame are completely transmitted to the base station. In an example, the second information may include a frame identifier (for example, a frame ID) of the video frame, the frame identifier of the video frame may be used to identify the video frame, and the frame identifier of the video frame may be pre-allocated. In this way, a video frame to which a data packet belongs may be learned based on a frame identifier that is of the video frame and that is carried in the data packet. In another example, the first information is irrelevant to a frame identifier of the video frame. For example, data packets of a first service (for example, data packets corresponding to all or some video frames of the first service) may be divided into a plurality of groups (groups). Optionally, data packets corresponding to one video frame are divided into one group, a group identifier (for example, a group ID) is correspondingly configured for each group, and first information carried in data packets in each group may be the group ID corresponding to the group. In this way, a group to which a data packet belongs may be learned based on a group ID carried in the data packet, and further, a video frame to which the data packet belongs is learned based on a correspondence between a group and a video frame.

Figure 7B:
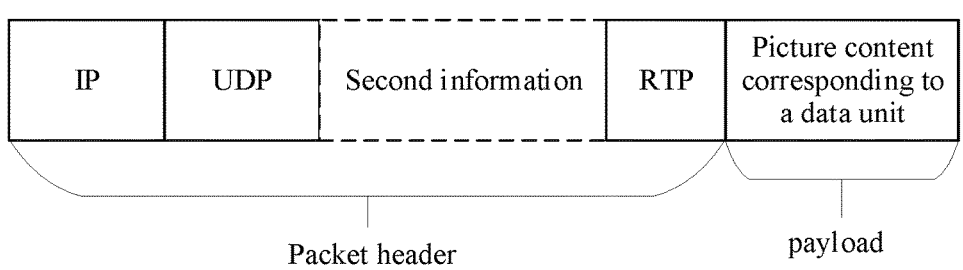
FIG. 7*b* is a schematic diagram of another format of a data packet according to an embodiment of this application.

For example, FIG. 7b is a schematic diagram of a data packet. As shown in FIG. 7b, the second information may be carried in a packet header of the data packet. For example, the second information is carried between a UDP field and an RTP field in the packet header, and one piece of picture content is carried in a payload. In this way, the data packet is obtained through encapsulation. It should be noted that FIG. 7b is merely a figure used as an example. In addition to the fields shown in FIG. 7b, another field such as an IP field may be further included. This is not limited.

Step 802: The UPF receives the data packet from the application server, and sends a received data packet to the base station.

For example, when GTP is supported between the UPF and the base station, the UPF encapsulates the packet header (header) of the data packet received from the application server into a GTP header and sends the data packet to the base station.

Step 803: The base station receives the data packet from the UPF, and identifies a service type of a service to which the data packet belongs. If the service to which the data packet belongs is the XR service, step 804 to step 806 are performed; otherwise, an existing procedure is performed, where for example, the data packet of the terminal is directly transmitted to the terminal.

For example, for a manner of identifying the service type by the base station in step 803, refer to the descriptions in step 603, and details are not described again.

Step 804: The base station determines, based on the second information carried in the data packet of the terminal, the importance of the data unit to which the data packet of the terminal belongs and the size level of the data unit to which the data packet of the terminal belongs.

For example, the base station may decapsulate the received data packet, obtain the second information from the packet header of the data packet, and determine, based on the second information, importance of the video frame to which the data packet of the terminal belongs and a size level of the video frame to which the data packet of the terminal belongs.

For example, the base station identifies, based on the second information carried in the data packet, the video frame to which the data packet belongs, determines a data amount of the video frame based on a total quantity of data packets that belong to the video frame and a size of each data packet, calculates a ratio of the data amount of the video frame to an average value of sizes of video frames that are successfully transmitted by the terminal, and determines the size level of the video frame based on the calculated ratio and the correspondence shown in Table 5.

The size of each data packet may be preset or specified in a protocol, and this is not limited.

For another example, the base station may identify, based on the second information carried in the data packet, the video frame to which the data packet belongs, and determine a data amount of the video frame based on a quantity of data packets that belong to the video frame and a size of each data packet. Because a data amount of an I-frame is much greater than that of a P-frame, the base station may obtain a position of the I-frame by sensing a data amount of each frame. The I-frame is a start frame of a GoP, so that a relative position of each video frame in the GoP is known, and then importance of each video frame is obtained based on the correspondence shown in Table 1.

Step 805: The base station determines a scheduling priority of the terminal based on the importance of the data unit to which the data packet of the terminal belongs and the size level of the data unit to which the data packet of the terminal belongs.

For related descriptions of a size of the data unit to which the data packet of the terminal belongs and the size level of the data unit to which the data packet of the terminal belongs, refer to the foregoing descriptions. For an execution process of step 805, refer to the descriptions in step 501. Details are not described again.

Step 806: The base station transmits the data packet with the terminal based on the scheduling priority of the terminal.

An execution process of step 806 is the same as a scheduling manner of the downlink data packet in step 502, and details are not described.

Alternatively, in the method shown in FIG. 8, a core network device such as the UPF may determine the scheduling priority of the terminal, and indicate the determined scheduling priority to the base station. For example, step 802 to step 805 may be replaced with the following steps: After receiving the data packet, the UPF decapsulates the received data packet, obtains the second information from the data packet, determines the scheduling priority of the terminal based on the importance of the data unit to which the data packet of the terminal belongs and the size level of the data unit that are determined based on the second information, and carries indication information that indicates the scheduling priority of the terminal in the packet header of the data packet. For example, the indication information is used to replace the second information carried in the data packet. The UPF encapsulates the data packet with a GTP packet header, and then sends a data packet to the base station. After receiving the data packet, the base station executes the identification process described in step 803, and after identifying that the service to which the data packet belongs is the XR service, obtains, from the packet header of the data packet, the indication information that indicates the scheduling priority of the terminal. Then, the base station transmits the data packet based on the obtained scheduling priority.

A manner in which the core network device determines the scheduling priority of the terminal is the same as the manner in which the access network device determines the scheduling priority of the terminal in step 501. Details are not described again.

Based on the method shown in FIG. 8, for the XR service, the scheduling priority of the terminal may be obtained through calculation based on the importance of the data unit to which the data packet of the terminal belongs and the size level of the data unit to which the data packet of the terminal belongs, and a terminal whose data unit is important and whose data unit is relatively small is preferentially scheduled to transmit a data packet, to maximize a quantity of correctly transmitted video frames of the terminal, ensure correct transmission of the important data unit of the terminal, and recover a complete video picture, thereby improving user experience and system performance.

It should be understood that, when the data unit to which the data packet of the terminal belongs is a slice or a tile, and the data packet of the terminal is a downlink data packet, the base station may determine, with reference to the method shown in FIG. 8, importance of the slice or the tile to which the data packet of the terminal belongs and a size level of the slice or the tile to which the data packet of the terminal belongs, determine the scheduling priority of the terminal based on the importance of the slice or the tile to which the data packet of the terminal belongs and the size level of the slice or the tile to which the data packet of the terminal belongs, and transmit the data packet of the slice or the tile based on the scheduling priority of the terminal. It is assumed that the data unit to which the data packet of the terminal belongs is a slice, and importance of the slice to which the data packet of the terminal belongs is determined based on a position of the slice in the video frame. The process is described as follows. As described below, the process may include step (a) to step (c).

Step (a): After generating picture content corresponding to the slice, the application layer of the application server packs and encapsulates the picture content corresponding to the slice into a plurality of data packets, and sends the plurality of data packets to the base station via the core network device. Each of the plurality of data packets carries third information, and the third information indicates a slice to which the data packet belongs and whether the slice is in an FOV of the video frame. It should be noted that, if the base station determines the scheduling priority of the terminal based on the importance of the slice to which the data packet of the terminal belongs and a size level of the slice to which the data packet of the terminal belongs, and data packets included in the slice are not transmitted to the base station once/at the same time, the third information may further indicate a total quantity of the data packets included in the slice.

Step (b): After receiving the plurality of data packets, the base station decapsulates the received data packets, obtains the third information from packet headers of the data packets, identifies, based on the third information, the slice to which the data packets belong, determines a data amount of the slice based on the total quantity of the data packets belonging to the slice and a size of each data packet, calculates a ratio of the data amount of the slice to an average value of sizes of slices successfully transmitted by the terminal, and determines the size level of the slice based on the calculated ratio and the correspondence shown in Table 5. In addition, the base station identifies, based on the third information carried in the data packet, whether the slice to which the data packet belongs is located in the FOV of the video frame, and then determines the importance of the slice based on the correspondence shown in Table 2.

Step (c): The base station determines the scheduling priority of the terminal based on the importance of the slice and the size level of the slice, and transmits the data packet of the slice with the terminal based on the scheduling priority of the terminal.

The foregoing mainly describes the solutions provided in embodiments of this application from a perspective of interaction between nodes. It may be understood that, to implement the foregoing functions, the nodes such as the access network device and the terminal include corresponding hardware structures and/or software modules for performing the functions. A person skilled in the art should be easily aware that algorithm steps in examples described with reference to embodiments disclosed in this specification can be implemented in a form of hardware, software, or a combination of hardware and computer software in the methods in embodiments of this application. Whether a function is performed by hardware or hardware driven by computer software depends on particular applications and design constraints of the technical solution. A person skilled in the art may use different methods to implement the described functions for each particular application, but it should not be considered that the implementation goes beyond the scope of embodiments of this application.

In embodiments of this application, functional modules of the access network device and the terminal may be divided based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely logical function division. In an actual implementation, another division manner may be used.

Figure 9:
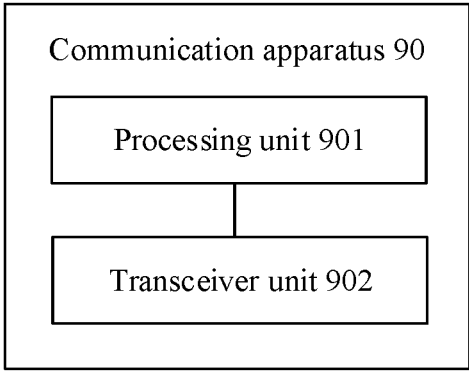
FIG. 9 is a schematic composition diagram of a communication apparatus 90 according to an embodiment of this application.

FIG. 9 is a structural diagram of a communication apparatus 90. The communication apparatus 90 may be an access network device, a chip or a system-on-a-chip in the access network device, another apparatus that can implement functions of the access network device in the foregoing methods, or the like. The communication apparatus 90 may be configured to perform the functions of the access network device in the foregoing method embodiments. In a feasible implementation, the communication apparatus 90 shown in FIG. 9 includes a processing unit 901 and a transceiver unit 902.

The processing unit 901 is configured to obtain a scheduling priority of a terminal, where the scheduling priority of the terminal is determined based on importance of a data unit to which a data packet of the terminal belongs and a size level of the data unit to which the data packet of the terminal belongs. For example, the processing unit 901 may be configured to support the communication apparatus 90 in performing step 501, step 605, and step 805.

The processing unit 901 is further configured to control, based on a scheduling priority of the terminal device, the transceiver unit 902 to transmit a data packet with the terminal device. For example, the processing unit 901 is further configured to support the communication apparatus 90 in performing step 502, step 606, and step 806.

Specifically, all related content of the steps in the foregoing method embodiments shown in FIG. 5 to FIG. 8 may be cited in function descriptions of the corresponding functional modules. Details are not described herein again. The communication apparatus 90 is configured to perform a function of the access network device in the scheduling transmission method shown in FIG. 5 to FIG. 8, and therefore can achieve a same effect as that of the foregoing scheduling transmission method.

In another feasible implementation, the communication apparatus 90 shown in FIG. 9 includes a processing module and a communication module. The processing module is configured to control and manage an action of the communication apparatus 90. For example, the processing module may integrate a function of the processing unit 901, and may be configured to support the communication apparatus 90 in performing steps such as step 501, step 605, step 805, step 502, step 606, and step 806. The communication module may integrate a function of the transceiver unit 902, and communicate with another network entity, for example, communicate with a functional module or a network entity shown in any one of the communication systems in FIG. 2 to FIG. 3*d*. The communication apparatus 90 may further include a storage module, configured to store instructions and/or data. When the instructions are executed by the processing module, the processing module is enabled to implement the method on an access network device side.

The processing module may be a processor, a controller, a module, or a circuit. The processing module may implement or execute various example logical blocks described with reference to content disclosed in embodiments of this application. The communication module may be a transceiver circuit, a pin, an interface circuit, a bus interface, a communication interface, or the like. The storage module may be a memory. When the processing module is the processor, the communication module is the communication interface, and the storage module is the memory, the communication apparatus 90 in this embodiment of this application may be the communication apparatus shown in FIG. 4.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by using a combination of hardware in the processor and a software module.

In embodiments of this application, the memory may be a non-volatile memory, such as a hard disk drive (hard disk drive, HDD) or a solid-state drive (solid-state drive, SSD), or may be a volatile memory (volatile memory), such as a random access memory (random access memory, RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store instructions and/or data.

Figure 10:
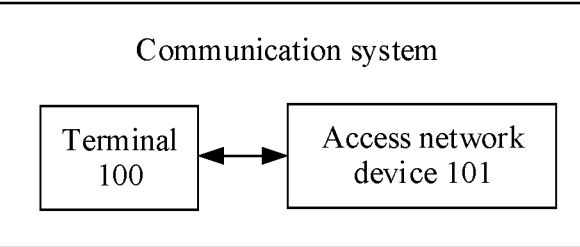
FIG. 10 is a schematic composition diagram of a communication system according to an embodiment of this application.

FIG. 10 is a structural diagram of a communication system according to an embodiment of this application. As shown in FIG. 10, the communication system may include a terminal 100 and an access network device 101. It should be noted that FIG. 10 is merely a figure used as an example. Network elements included in the communication system shown in FIG. 10 and a quantity of the network elements are not limited in this embodiment of this application.

The terminal 100 has functions of the terminal in the one or more methods shown in FIG. 5 to FIG. 8. The access network device 101 has functions of the access network device in the one or more methods shown in FIG. 5 to FIG. 8.

In embodiments of this application, "/" may represent an "or" relationship between associated objects. For example, A/B may represent A or B. "And/or" may indicate that there are three relationships between associated objects. For example, A and/or B may represent the following three cases: Only A exists, both A and B exist, and only B exists. A and B may be singular or plural. To facilitate description of the technical solutions in embodiments of this application, in embodiments of this application, terms such as "first" and "second" may be used to distinguish between technical features with same or similar functions. The terms such as "first" and "second" do not limit a quantity and an execution sequence, and the terms such as "first" and "second" do not indicate a definite difference. In embodiments of this application, the term such as "example" or "for example" is used to represent an example, an illustration, or a description. Any embodiment or design scheme described with "example" or "for example" should not be explained as being more preferred or having more advantages than another embodiment or design scheme. Use of the term such as "example" or "for example" is intended to present a related concept in a specific manner for ease of understanding.

In embodiments of this application, "first", "second", "third", "A", "B", "C", "D", and the like are used for distinguishing between technical features described by "first", "second", "third", "A", "B", "C", "D", and the like. There is no chronological order or no size order between the technical features described by "first", "second", "third", "A", "B", "C", "D", and the like.

It should be understood that in embodiments of this application, "B corresponding to A" indicates that B is associated with A. For example, B may be determined based on A. It should be further understood that determining B based on A does not mean that B is determined based only on A. B may alternatively be determined based on A and/or other information. In addition, in embodiments of this application, "connection" means various connection manners such as a direct connection or an indirect connection, for implementing communication between devices. This is not limited in embodiments of this application.

In embodiments of this application, unless otherwise specified, "transmission" (transmit/transmission) refers to bidirectional transmission, and includes a sending action and/or a receiving action. Specifically, "transmission" in embodiments of this application includes data sending, data receiving, or data sending and data receiving. In other words, data transmission herein includes uplink data transmission and/or downlink data transmission. Data may include a channel and/or a signal. The uplink data transmission is uplink channel transmission and/or uplink signal transmission, and the downlink data transmission is downlink channel transmission and/or downlink signal transmission. In embodiments of this application, a "network" and a "system" express a same concept, and a communication system is a communication network.

Division into modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

All or a part of the technical solutions provided in embodiments of this application may be implemented by using software, hardware, firmware, or any combination thereof. When software is used to implement the foregoing embodiments, all or some of embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, a wireless control apparatus, an access network device, a terminal, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium, or the like.

In embodiments of this application, when there is no logical conflict, embodiments may be mutually referenced. For example, methods and/or terms in the method embodiments may be mutually referenced, and functions and/or terms in the apparatus embodiments may be mutually referenced. For example, functions and/or terms between the apparatus embodiments and the method embodiments may be mutually referenced.

The foregoing descriptions are merely specific implementations of embodiments of this application, but are not intended to limit the protection scope of embodiments of this application. Any variation or replacement within the technical scope disclosed in embodiments of this application shall fall within the protection scope of embodiments of this application. Therefore, the protection scope of embodiments of this application shall be subject to the protection scope of the claims.

What is claimed is:

1. A scheduling transmission method, comprising:
obtaining a scheduling priority of a terminal, wherein the scheduling priority of the terminal is determined based on importance of a data unit to which a data packet of the terminal belongs and a size level of the data unit to which the data packet of the terminal belongs,
   wherein the data packet of the terminal carries first information indicating the importance of the data unit to which the data packet of the terminal belongs and the size level of the data unit to which the data packet of the terminal belongs,
   wherein there is a correspondence between the size level of the data unit to which the data packet of the terminal belongs and a first ratio, wherein the first ratio=A/B, A is a size of the data unit to which the data packet of the terminal belongs, and B is an average value of sizes of data units successfully transmitted by the terminal, or B is an average value of sizes of data units of a video source corresponding to the data packet of the terminal; and
transmitting the data packet of the terminal based on the scheduling priority of the terminal.

2. The method of claim 1, wherein the importance of the data unit to which the data packet of the terminal belongs is determined based on one or more of the following: a position, in a group of pictures (GoP), of a video frame to which the data packet of the terminal belongs, a position of the data unit in the video frame to which the data unit belongs, or a user level corresponding to the terminal.

3. The method of claim 1, wherein
the scheduling priority of the terminal is determined based a first parameter as well as the importance of the data unit and the size level of the data unit, wherein
the first parameter comprises one or more of the following: a ratio of transmitted data packets of the data unit to which the data packet of the terminal belongs, an estimated transmission delay of a remaining data packet of the data unit to which the data packet of the terminal belongs, an instantaneous rate of the terminal, or a historical transmission rate of the terminal.

4. The method of claim 1, wherein the scheduling priority of the terminal is determined in a case that the data packet of the terminal is a data packet of a first service, wherein a target video frame correctness rate of the first service is greater than a threshold.

5. The method of claim 1, wherein
the scheduling priority of the terminal is determined by a first network element based on the importance of the data unit to which the data packet of the terminal belongs and the size level of the data unit to which the data packet of the terminal belongs, wherein the first network element is an access network device or a chip or a functional module in the access network device, or the first network element is a core network device or a chip or a functional module in the core network device.

6. An apparatus, comprising:

one or more processors; and a non-transitory memory having instructions stored thereon that, when executed by the one or more processors, cause the apparatus to:

obtain a scheduling priority of a terminal, wherein the scheduling priority of the terminal is determined based on importance of a data unit to which a data packet of the terminal belongs and a size level of the data unit to which the data packet of the terminal belongs, wherein the data packet of the terminal carries first information indicating the importance of the data unit to which the data packet of the terminal belongs and the size level of the data unit to which the data packet of the terminal belongs, wherein there is a correspondence between the size level of the data unit to which the data packet of the terminal belongs and a first ratio, wherein the first ratio=A/B, A is a size of the data unit to which the data packet of the terminal belongs, and B is an average value of sizes of data units successfully transmitted by the terminal, or B is an average value of sizes of data units of a video source corresponding to the data packet of the terminal; and transmit the data packet of the terminal based on the scheduling priority of the terminal.

7. The apparatus of claim 6, wherein the importance of the data unit to which the data packet of the terminal belongs is determined based on one or more of the following: a position, in a group of pictures (GoP), of a video frame to which the data packet of the terminal belongs, a position of the data unit in the video frame to which the data unit belongs, or a user level corresponding to the terminal.

8. The apparatus of claim 6, wherein the scheduling priority of the terminal is determined based on a first parameter as well as the importance of the data unit and the size level of the data unit, wherein the first parameter comprises one or more of the following: a ratio of transmitted data packets of the data unit to which the data packet of the terminal belongs, an estimated transmission delay of a remaining data packet of the data unit to which the data packet of the terminal belongs, an instantaneous rate of the terminal, or a historical transmission rate of the terminal.

9. The apparatus of claim 6, wherein the scheduling priority of the terminal is determined in a case that the data packet of the terminal is a data packet of a first service, wherein a target video frame correctness rate of the first service is greater than a threshold.

10. The apparatus of claim 6, wherein the scheduling priority of the terminal is determined by a first network element based on the importance of the data unit to which the data packet of the terminal belongs and the size level of the data unit to which the data packet of the terminal belongs, wherein the first network element is an access network device or a chip or a functional module in the access network device, or the first network element is a core network device or a chip or a functional module in the core network device.

11. A non-transitory computer readable medium storing instructions that are executable by a computer, the non-transitory computer readable medium is applied to a first communication apparatus, and the instructions comprise instructions for:

obtaining a scheduling priority of a terminal, wherein the scheduling priority of the terminal is determined based on importance of a data unit to which a data packet of the terminal belongs and a size level of the data unit to which the data packet of the terminal belongs, wherein the data packet of the terminal carries first information indicating the importance of the data unit to which the data packet of the terminal belongs and the size level of the data unit to which the data packet of the terminal belongs, wherein there is a correspondence between the size level of the data unit to which the data packet of the terminal belongs and a first ratio, wherein the first ratio-A/B, A is a size of the data unit to which the data packet of the terminal belongs, and B is an average value of sizes of data units successfully transmitted by the terminal, or B is an average value of sizes of data units of a video source corresponding to the data packet of the terminal; and transmitting the data packet of the terminal based on the scheduling priority of the terminal.

12. The non-transitory computer readable medium of claim 11, wherein the importance of the data unit to which the data packet of the terminal belongs is determined based on one or more of the following: a position, in a group of pictures (GoP), of a video frame to which the data packet of the terminal belongs, a position of the data unit in the video frame to which the data unit belongs, or a user level corresponding to the terminal.

13. The non-transitory computer readable medium of claim 11, wherein the scheduling priority of the terminal is determined based on a first parameter as well as the importance of the data unit and the size level of the data unit, wherein the first parameter comprises one or more of the following: a ratio of transmitted data packets of the data unit to which the data packet of the terminal belongs, an estimated transmission delay of a remaining data packet of the data unit to which the data packet of the terminal belongs, an instantaneous rate of the terminal, or a historical transmission rate of the terminal.

14. The non-transitory computer readable medium of claim 11, wherein the scheduling priority of the terminal is determined by a first network element based on the importance of the data unit to which the data packet of the terminal belongs and the size level of the data unit to which the data packet of the terminal belongs, wherein the first network element is an access network device or a chip or a functional module in the access network device, or the first network element is a core network device or a chip or a functional module in the core network device.

* * * * *